March 19, 1957    G. SLAYTER ET AL    2,785,728
ARTICLE OF MANUFACTURE AND METHOD AND
APPARATUS FOR PRODUCING SAME
Filed Nov. 23, 1953            19 Sheets-Sheet 7
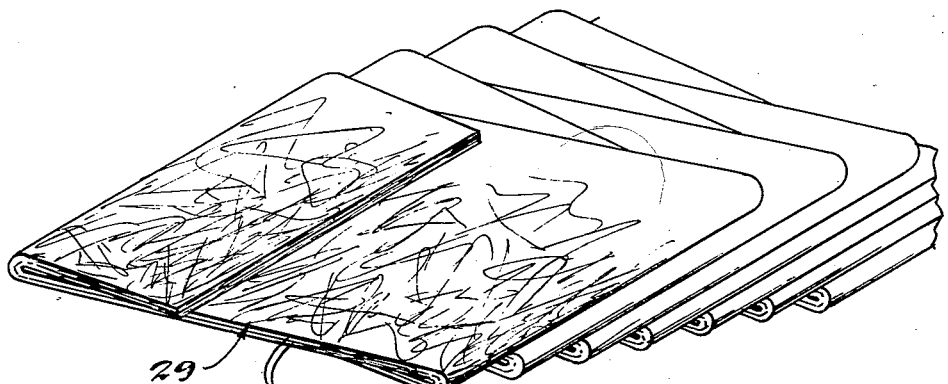
FIG-12-
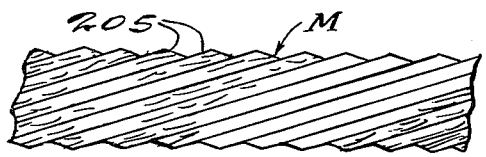
FIG-13-
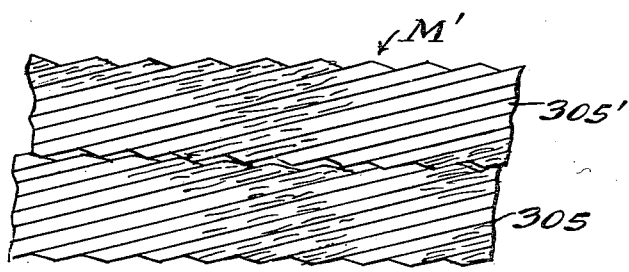
FIG-16-
INVENTORS:
GAMES SLAYTER, HENRY J. SNOW,
BY SAMUEL D. PHILIPPS.
ATTORNEYS.

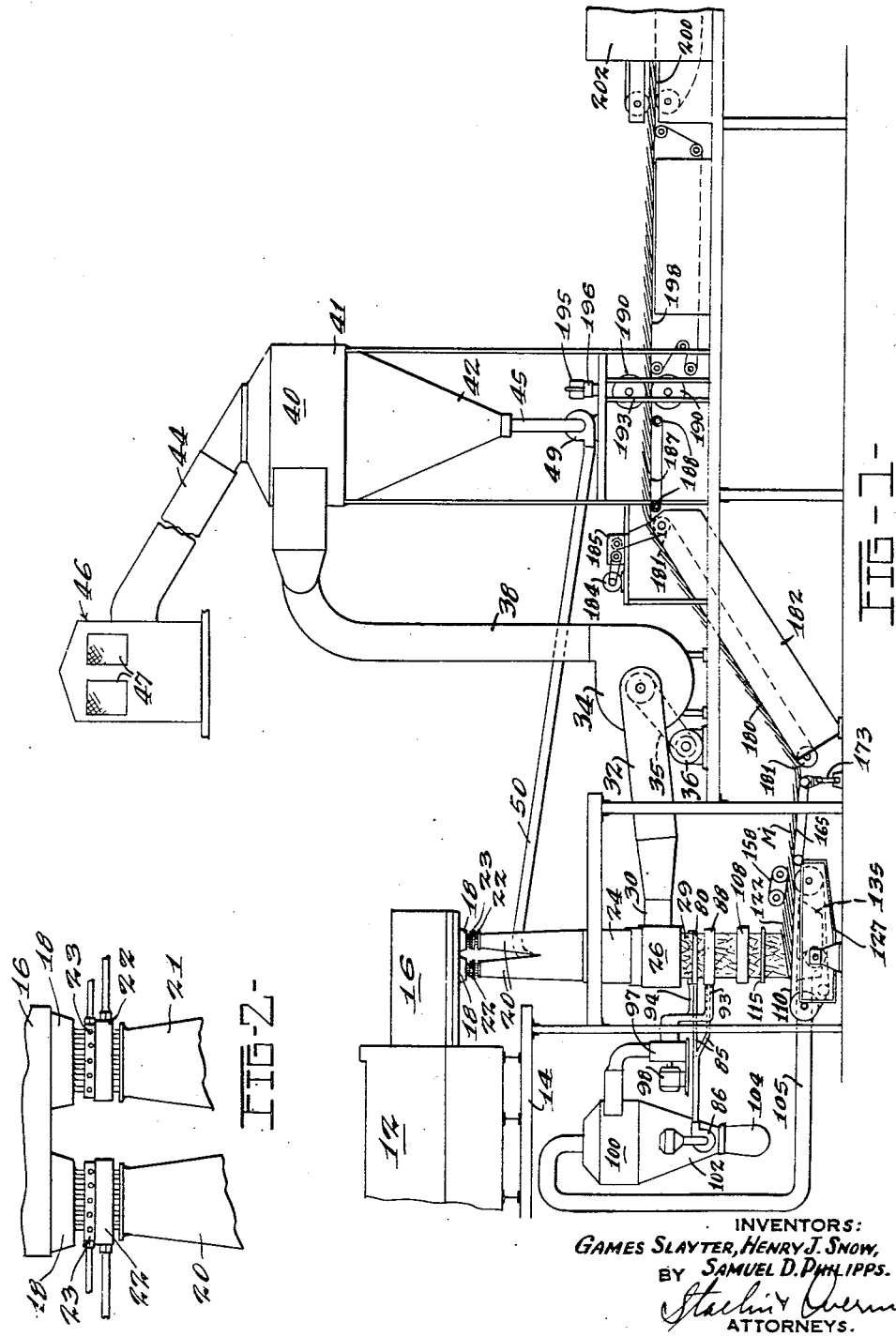

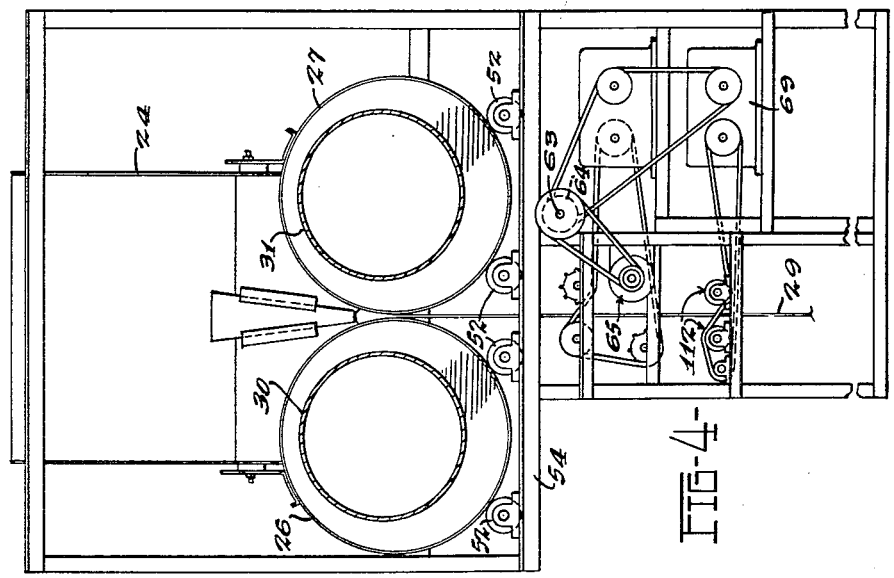
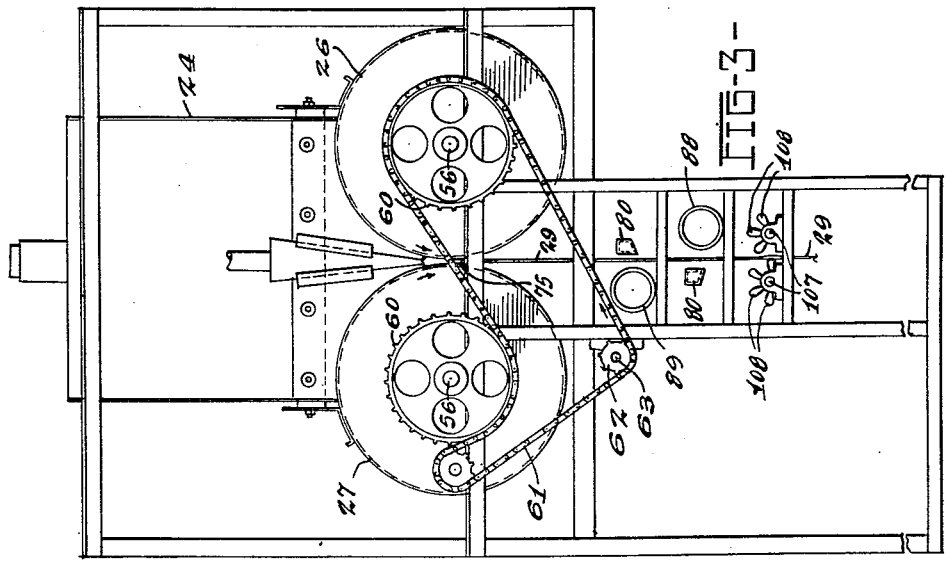

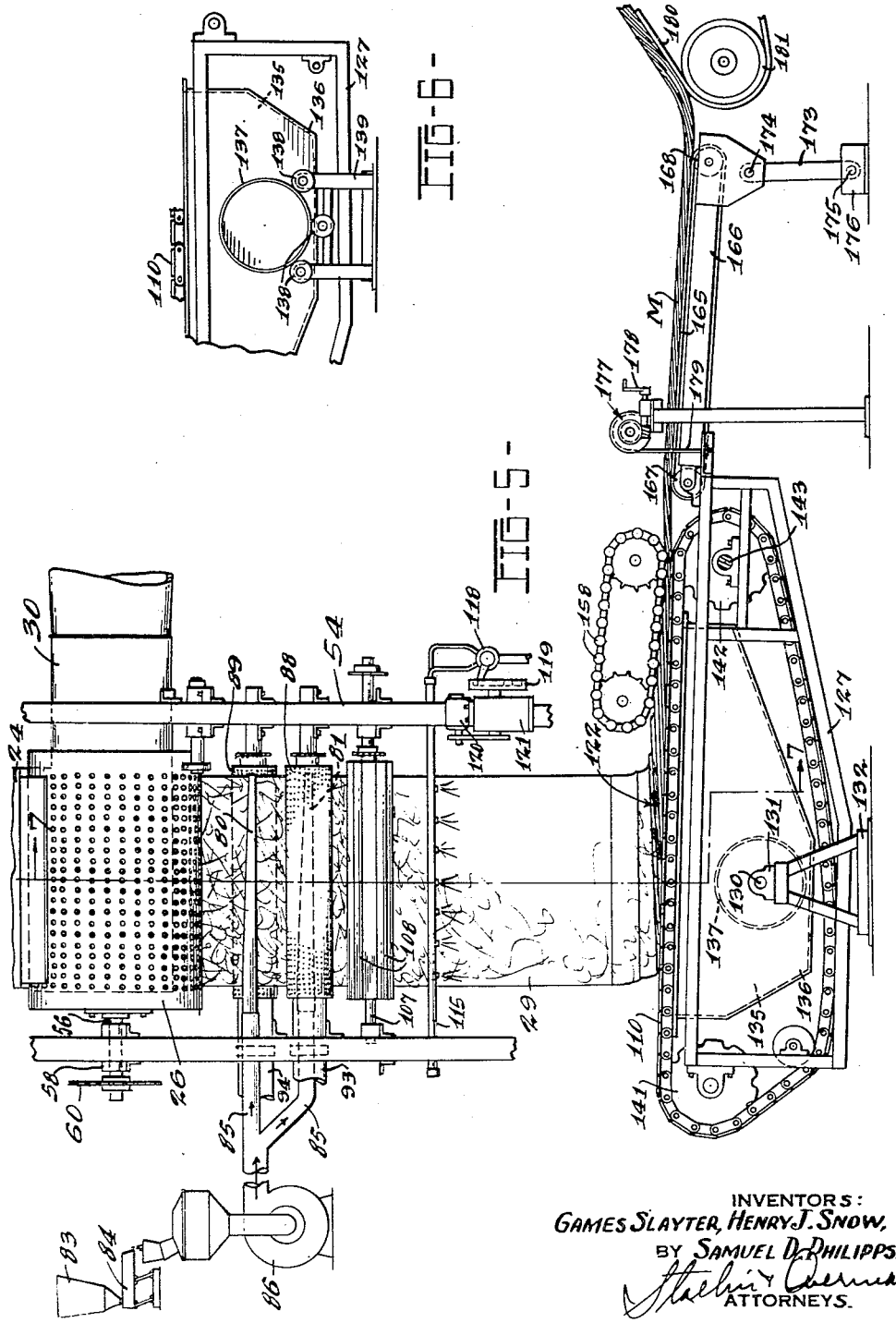

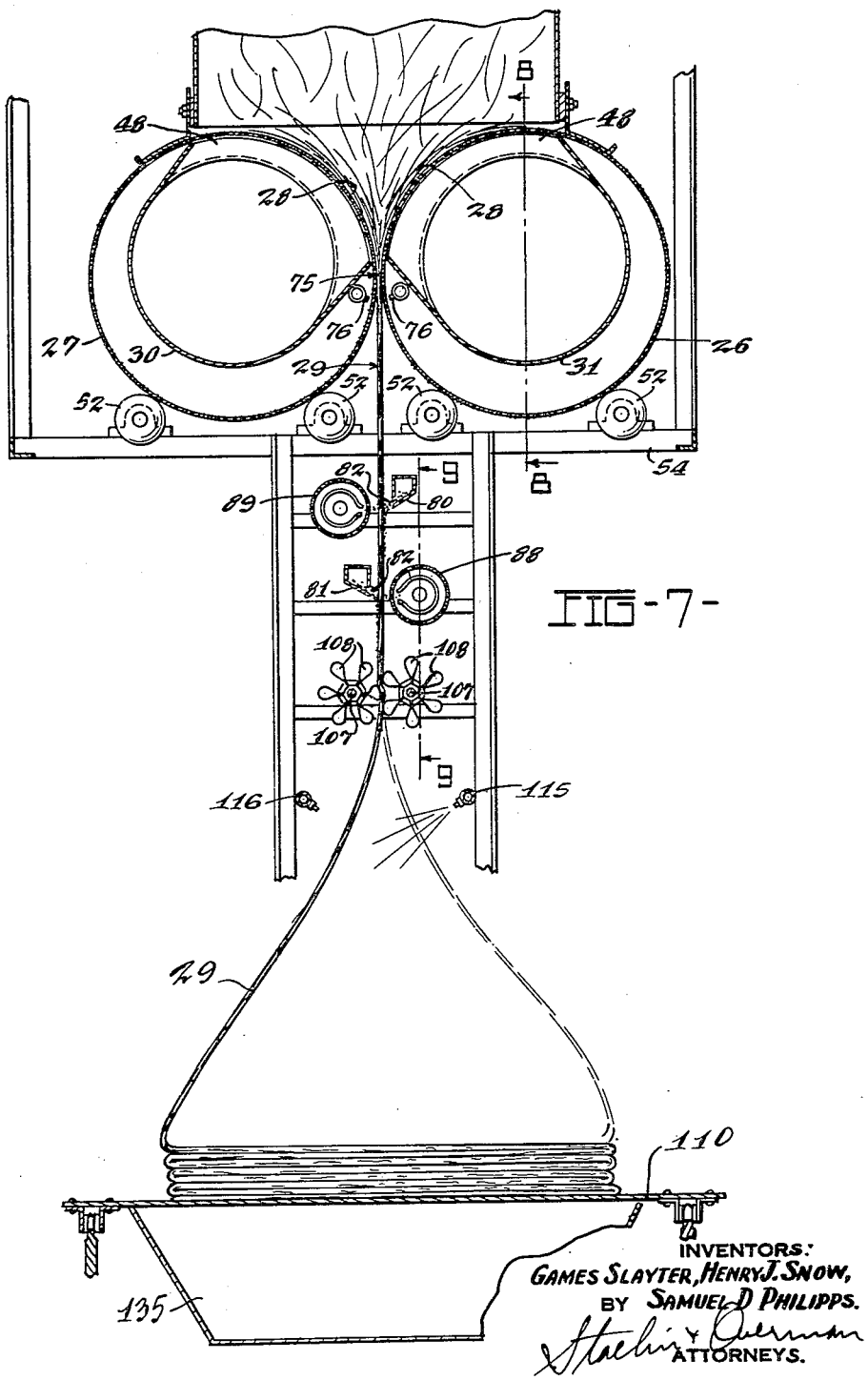

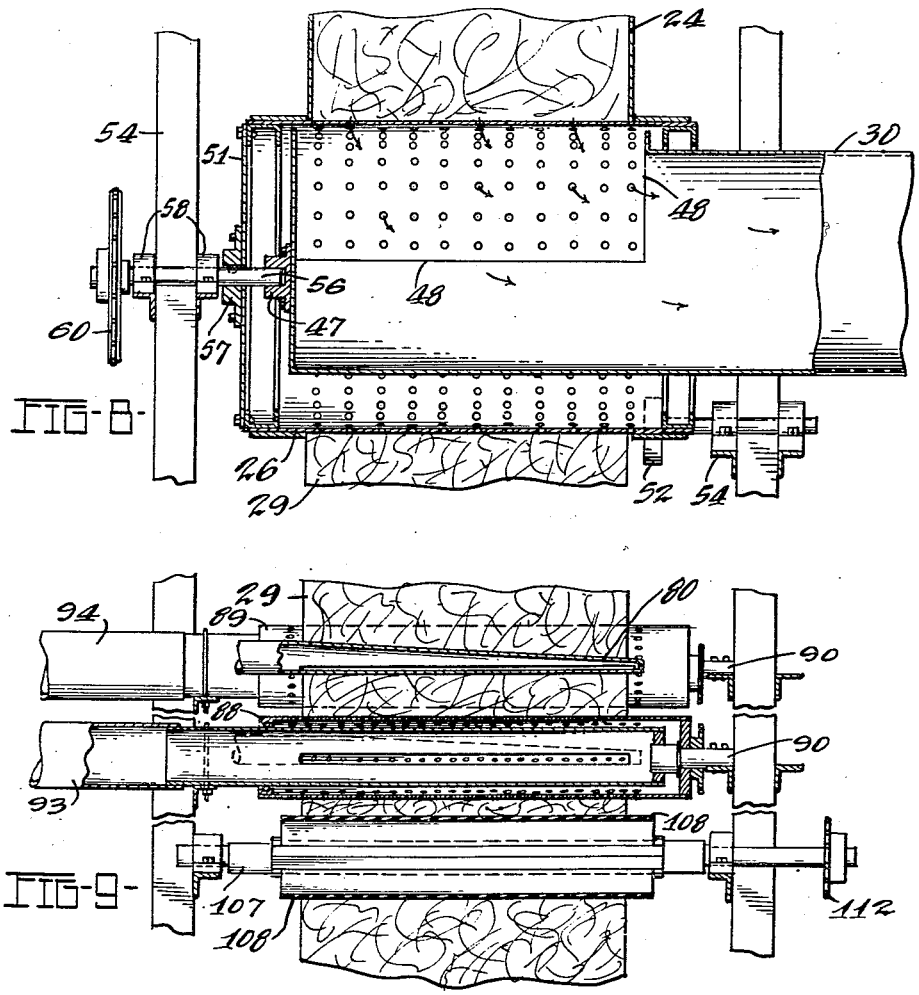

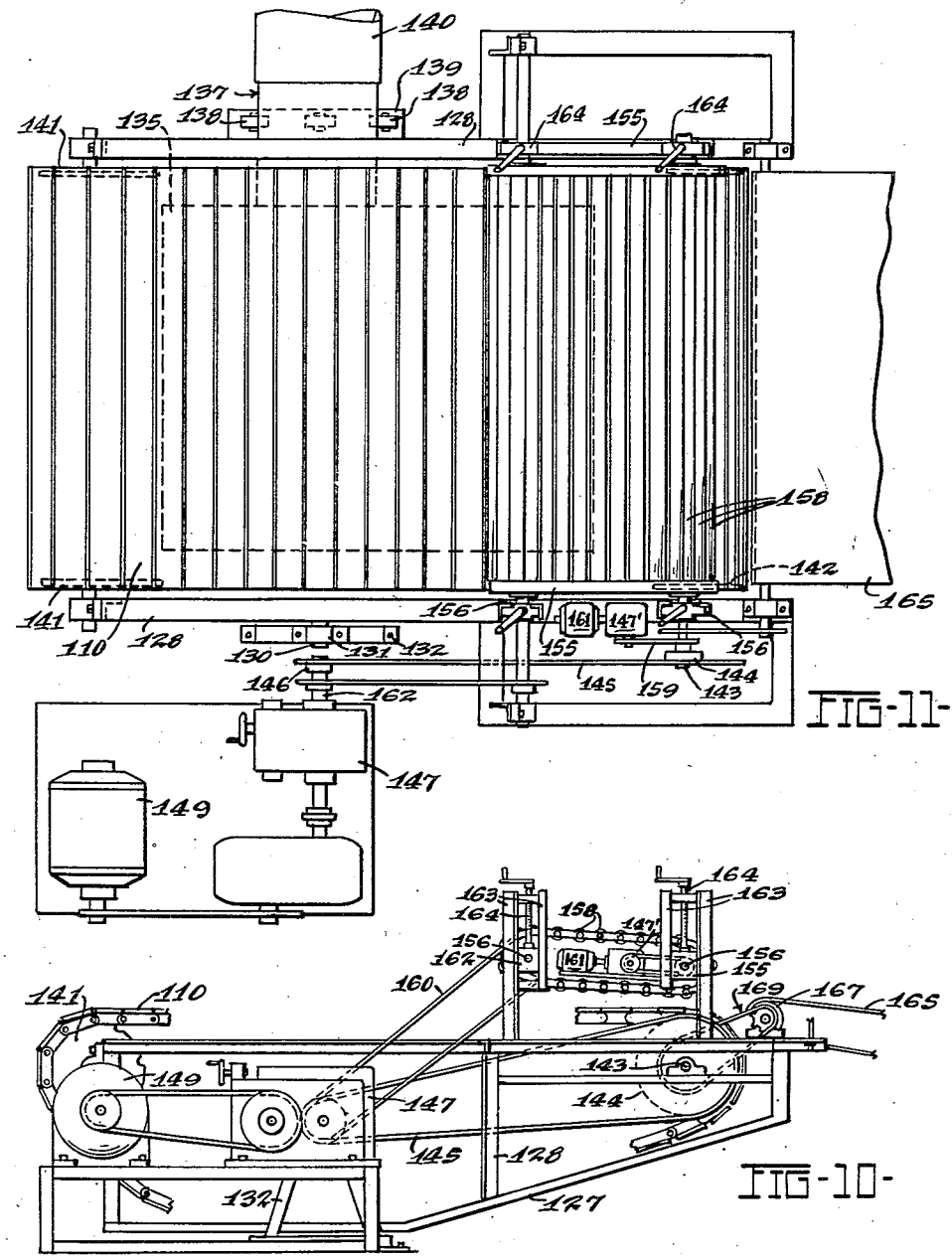

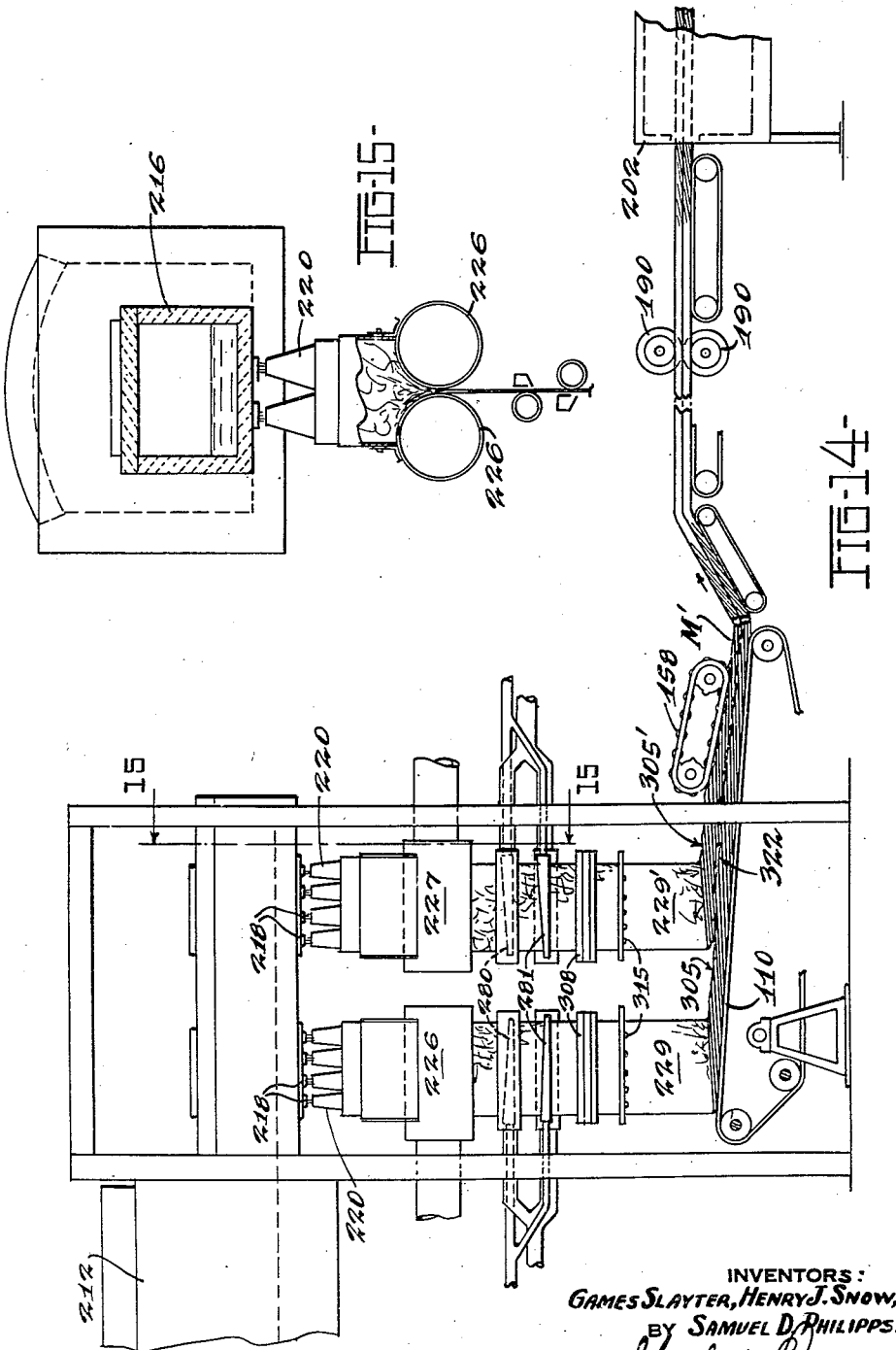

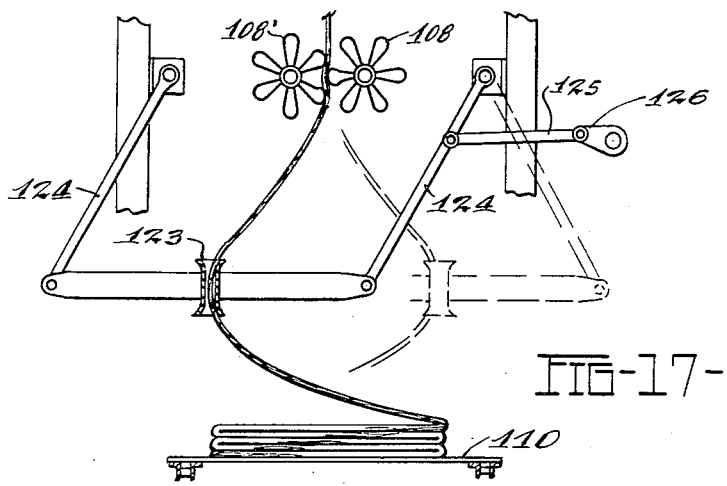
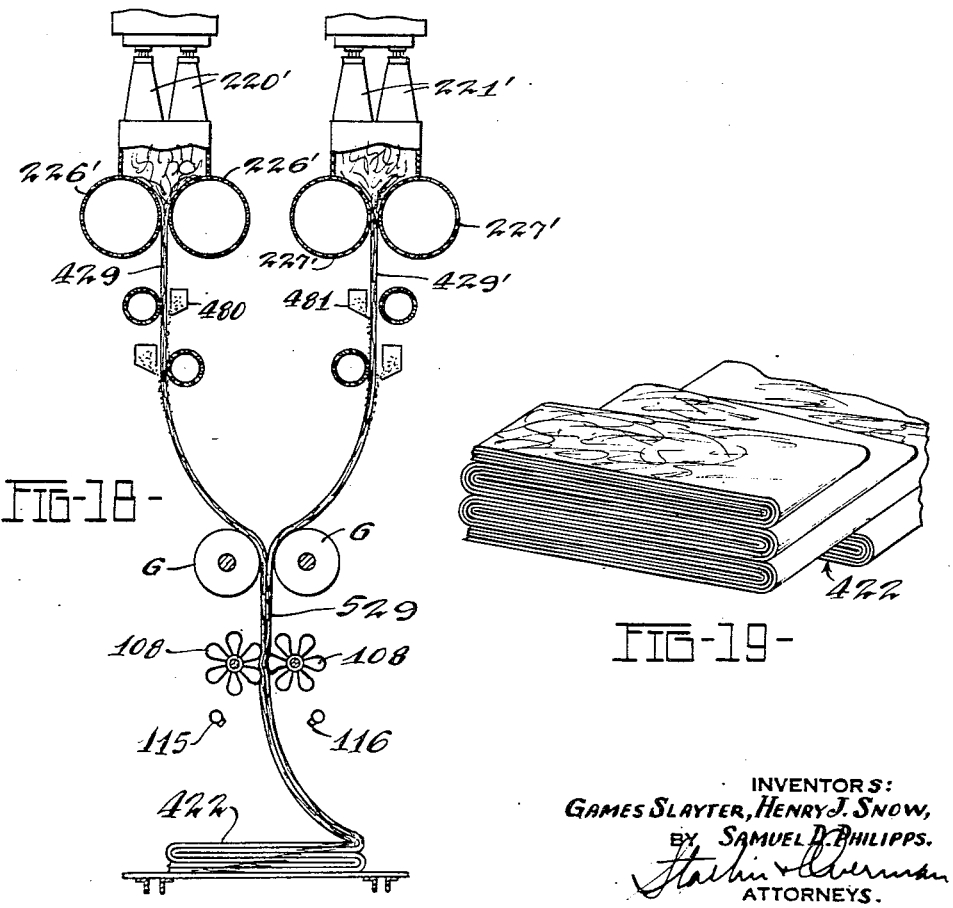

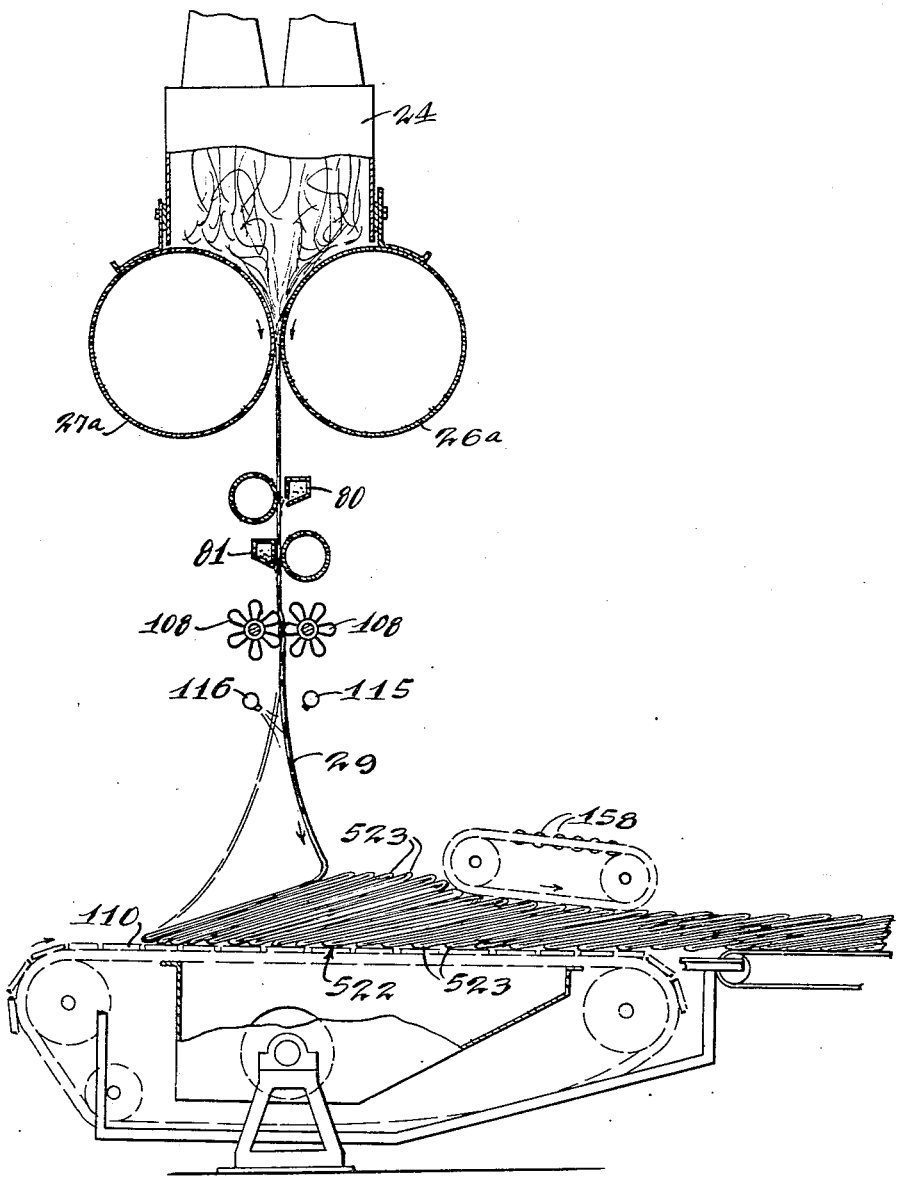
FIG-20-

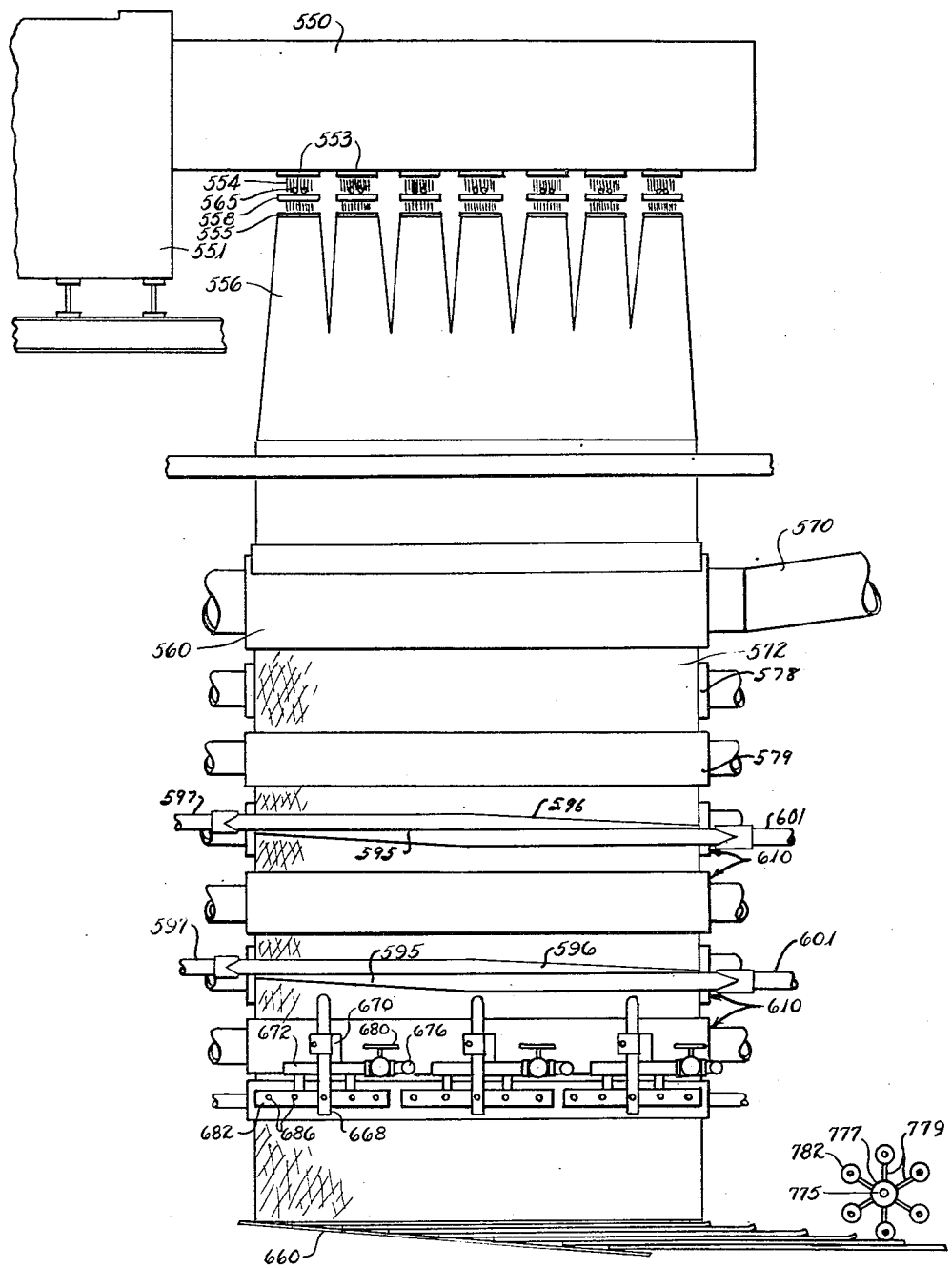

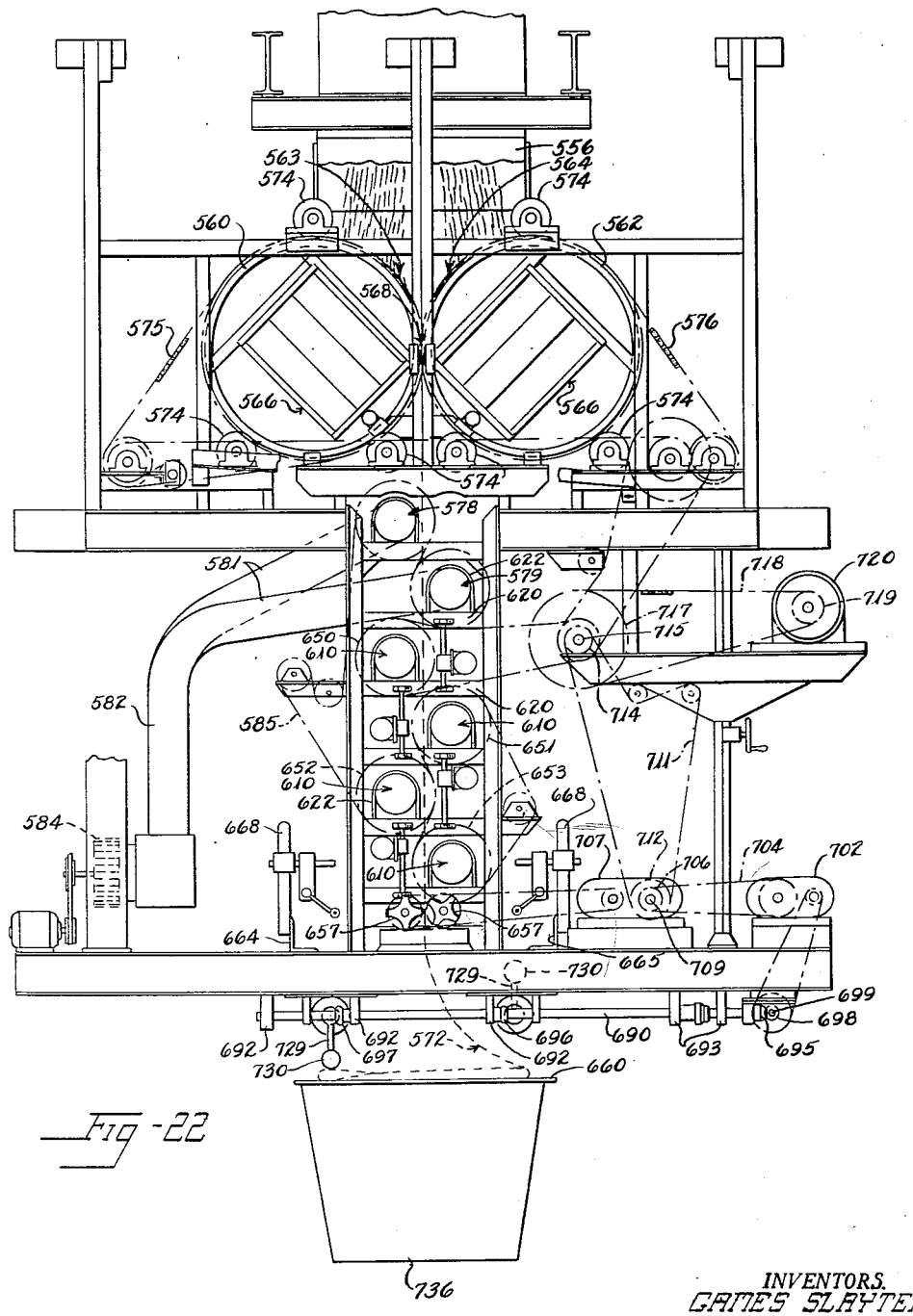

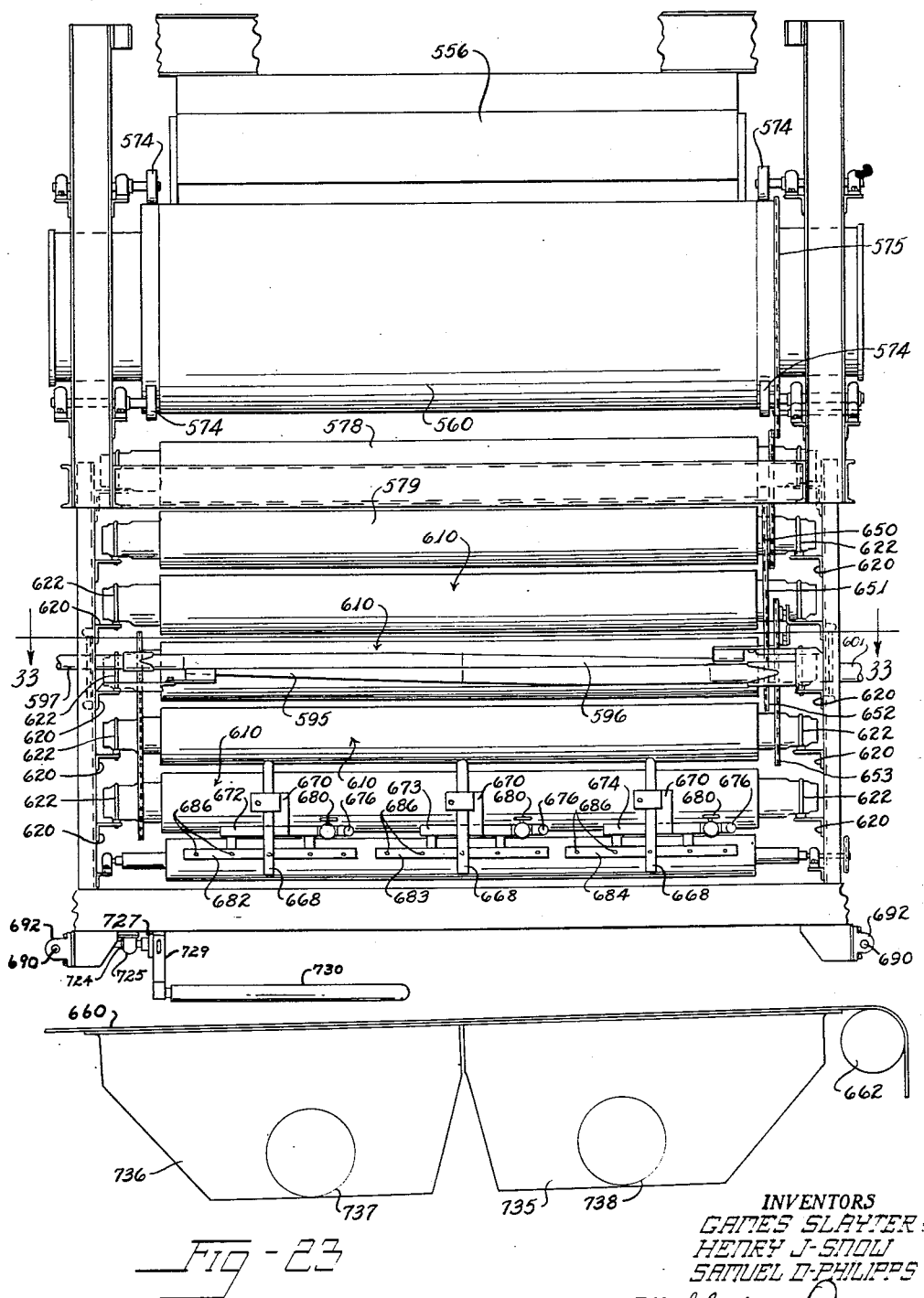

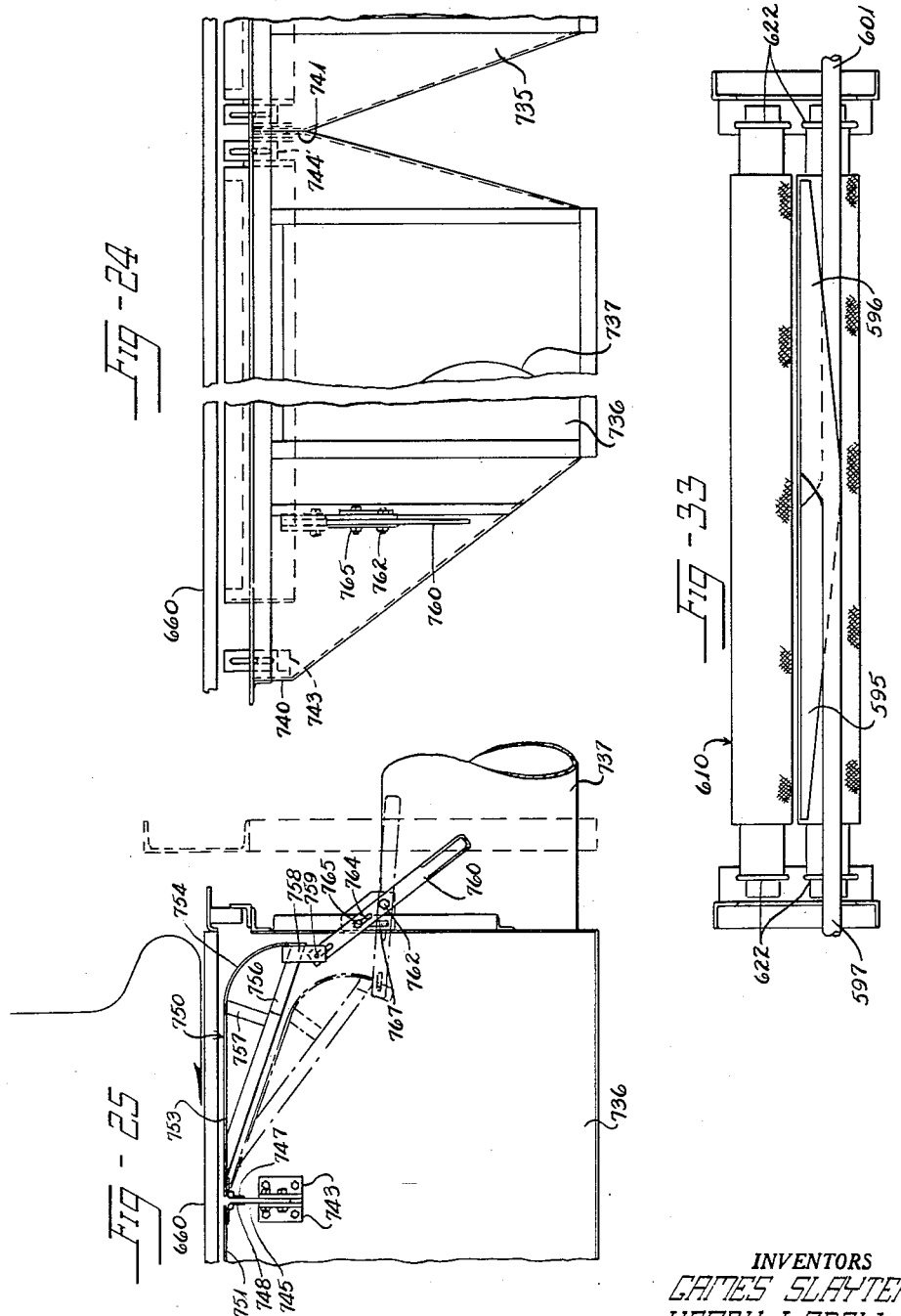

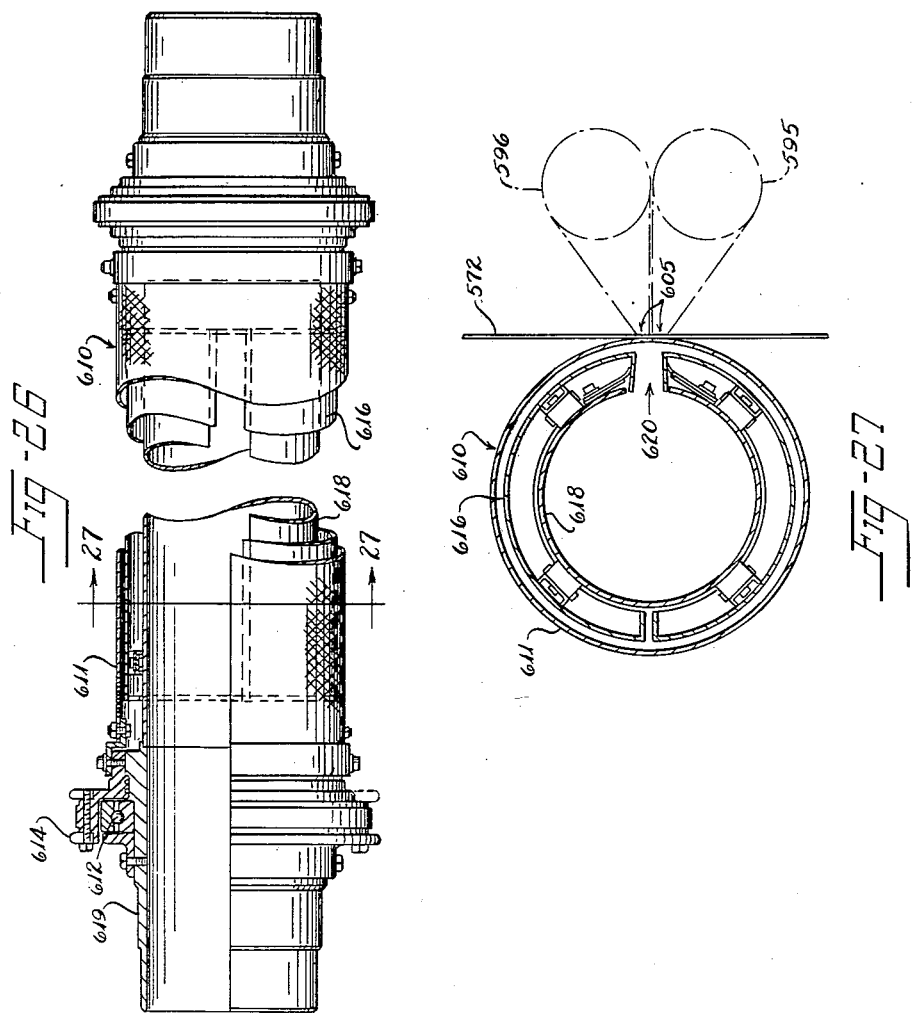

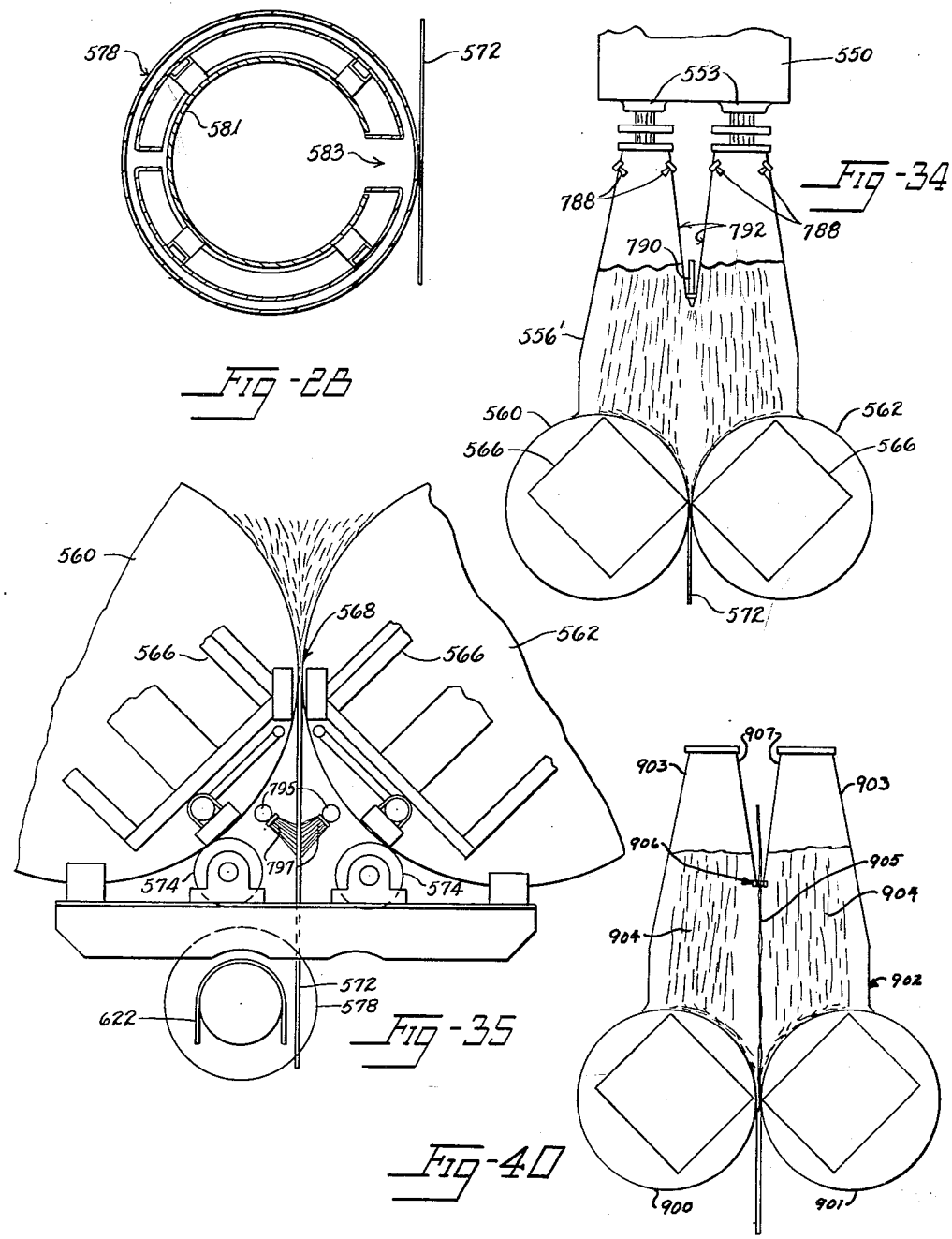

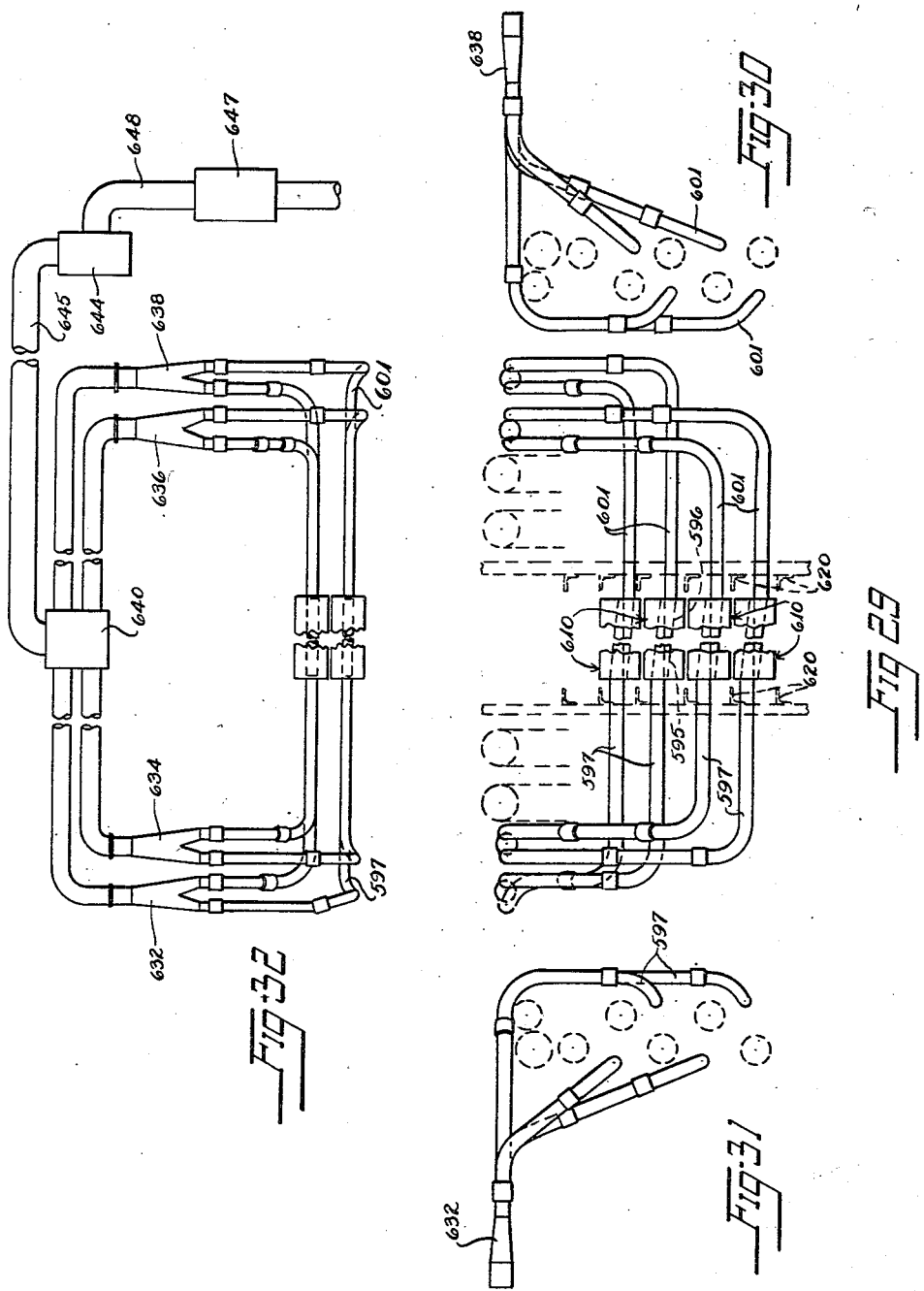

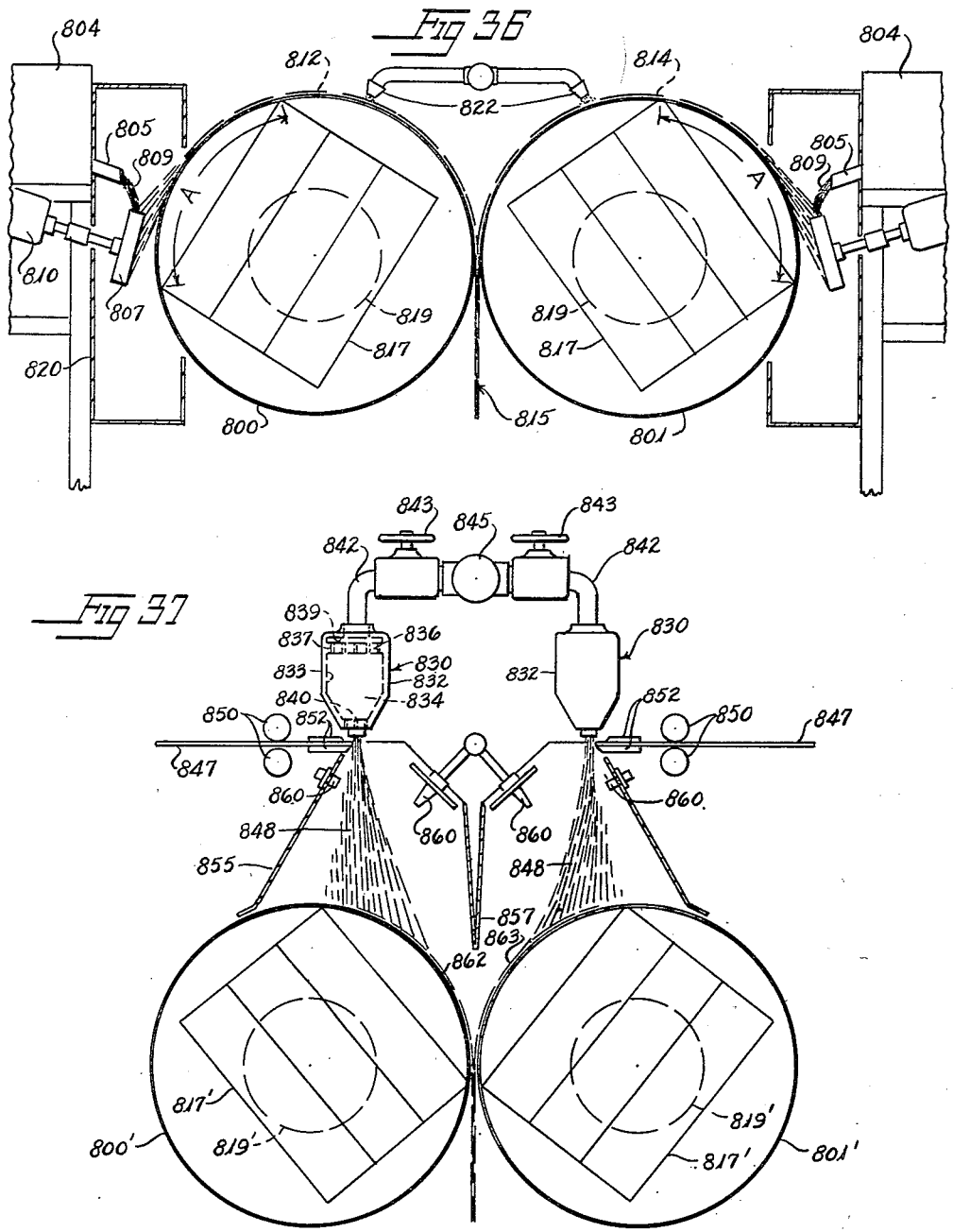

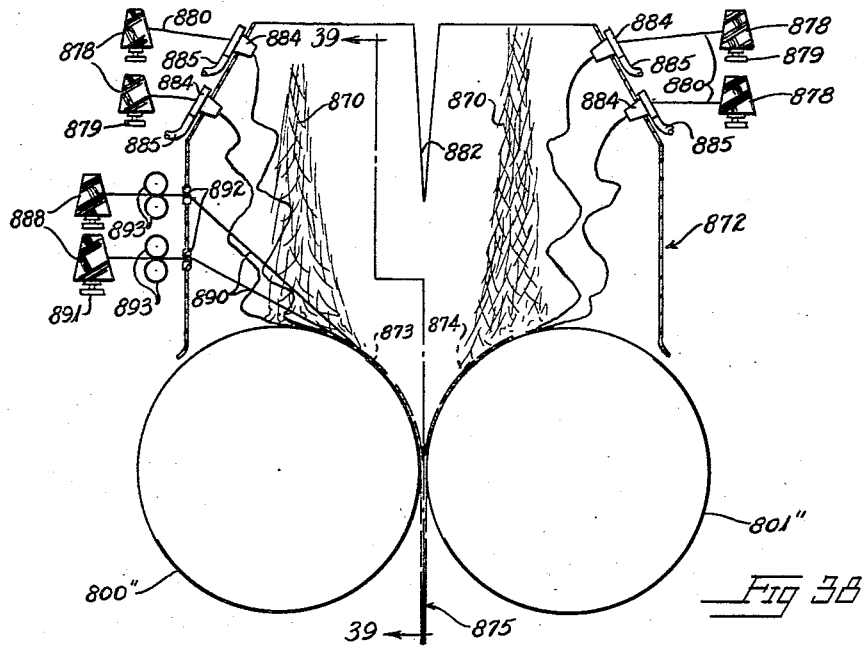
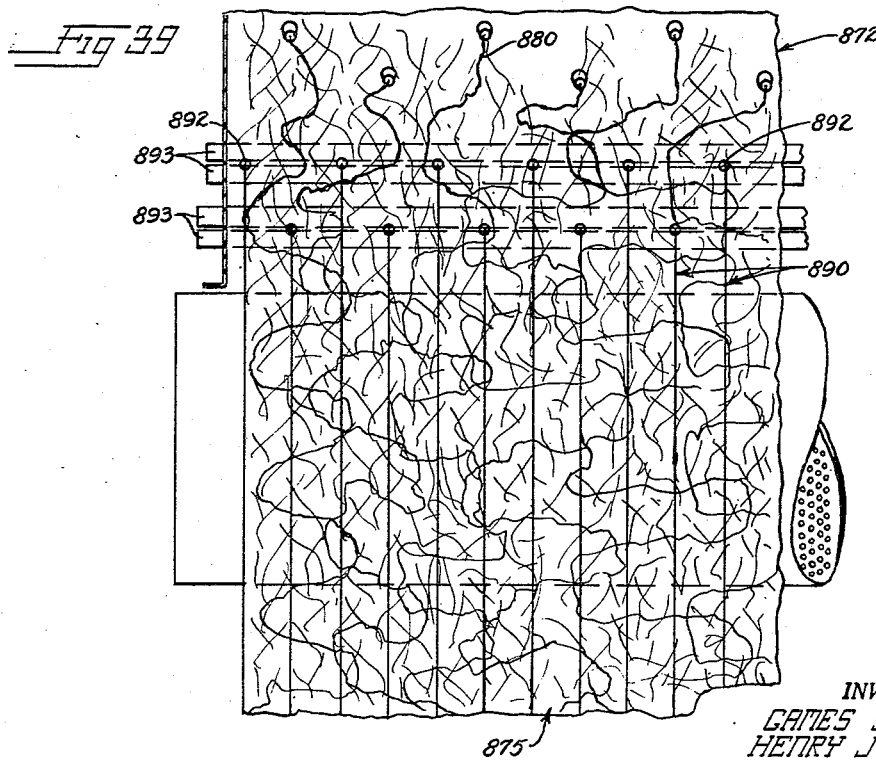

United States Patent Office 2,785,728
Patented Mar. 19, 1957

2,785,728

ARTICLE OF MANUFACTURE AND METHOD AND APPARATUS FOR PRODUCING SAME

Games Slayter, Newark, Ohio, Henry J. Snow, Kansas City, Mo., and Samuel D. Philipps, Granville, Ohio, assignors to Owens-Corning Fiberglas Corporation, Toledo, Ohio, a corporation of Delaware Application November 23, 1953, Serial No. 393,833

33 Claims. (Cl. 154—27)

This invention relates to mats or bats of fibers and method and apparatus for producing same, the invention more especially relating to the production of mats or bats of multilayer or laminar construction fabricated of fibers from mineral materials, and is a continuation-in-part of our application Serial Number 234,252, filed June 29, 1951, issued into Patent No. 2,736,362.

Heretofore in the production or manufacture of fibrous insulating units, it has been a usual practice to form a binder-impregnated, haphazardly arranged mass of mineral fibers, cure the binder and subdivide the mass into mats or bats of desired dimension suitable for heat or sound insulation or other purposes. In forming bats or mats of this character, the fibers are produced from fusible minerals such as fusible rock, slag, or glass by flowing streams of glass or other material from a supply and attenuating, fiberizing or drawing out the streams to fiber form by engaging the streams with blasts of steam or other gas and as the fibers are formed, a suitable binder usually in aqueous solution or suspension is applied thereto.

The fibers thus formed are collected in a haphazard mass upon a movable foraminous conveyor, the mass being moved throgh fixation rollers to establish a desired thickness and density of the fibrous assembly which is then conveyed through a curing zone or oven of a suitable temperature to cure or set the binder and thus impart mass integrity to the fibrous assembly. The fibrous assembly is then cut or severed into sizes especially adaptable for installations of the mats or bats for particular purposes as for insulating stoves, refrigerators, and other allied uses.

The methods employed in spraying or applying a binder onto the fibers may not facilitate or result in a uniform distribution of the binder through the fibers and hence in many instances the bats or mats have zones of concentrations of the binder while other zones may be sparsely treated with the binder. A lack of homogeneity of the binder constituent in the mass may reduce the insulating efficiency as concentrations of the binder material provide a facile path for the transfer or transmission of heat.

In forming mats or bats of fibers in the foregoing mentioned manner, the fibers are of indiscriminate lengths; and under the influence of the turbulence existing in the fiber-forming hood augmented by the presence of the binder, the fibers are deposited in a haphazard mass with fibers of varying lengths extending in all directions. In such an assembled mass, many of the fibers extend from one major face of the mass to the other. The fibers that extend through the mat provide a direct medium or path for conveying heat readily from one face to the other and as mineral fibers have a relative heat conductivity factor higher than air, the insulating value of the mat or bat may in many instances be impaired or reduced by such condition.

By reason of the haphazard assembly of the fibers at the time of their formation into a single agglomerate or mass, control of orientation or positioning of individual fibers or groups of fibers is practically impossible, and the insulating value of fibrous mats or bats fabricated by such methods may vary over a wide range dependent upon the number of fibers in a given zone extending crosswise or transversely through the mat.

In applying the binder to the fibers, an aqueous solution or suspension is utilized which is usually low in solids or binder content in attempting to secure a distribution of the binder among the fibers. The application of the binder in a liquid injected onto the fibers in the forming chamber and the presence of lubricants applied to the fibers to reduce interabrasion have a tendency to interfere with an even fall of the fibers and cause them to become entangled as they move to the collecting surface. The fibers are collected upon a foraminous surface aided by suction or reduced pressure. As the fibers build up into a comparatively thick mass, back pressures of the fiber-attenuating gases may be encountered in the fiber-forming chamber as the suction is diminished by the gradual increase in thickness of the collected mass, a condition fostering turbulence in the fiber-forming chamber and formation of wads or clumps of fibers. The presence of wads or tangled clumps of fibers in the mat tends to reduce the insulating efficiency of the product.

Furthermore, the aqueous constituents of the binder application must be vaporized or driven off in the binder-curing process, an operation requiring a large amount of heat and hence increasing the cost of the product.

The present invention embraces a method and apparatus for producing fibrous mats or assemblies wherein the cost of fabrication thereof is greatly reduced and the insulating value or efficiency of the produce improved over prior fibrous mat constructions.

An object of the invention resides in a method and apparatus for forming a relatively thin veil, web or stratum of attenuated fibers folded or lapped upon itself to form a mat in a manner eliminating the projection of individual fibers from one major face of the mat to the other.

The method of the invention embraces the steps of forming fibers of mineral material and collecting them in individual layers or webs which are caused to be brought into contiguous relation to form a relatively thin layer or veil of a laminated character wherein the fibers of one layer do not extend or project through to the outer surface of the other layer whereby the insulation factor is greatly improved over prior fibrous insulating units.

An object of the invention resides in a method of forming and collecting masses of mineral fibers in spaced zones, bringing the collected masses into contiguous relation and applying a binding material in a manner whereby the material is distributed through the contiguous layers of fibers thus augmenting the insulating efficiency by reason of the uniform distribution of binding material in and throughout the layers of fibers.

Another object of the invention resides in the production of a fibrous mat having high insulating characteristics with a minimum amount of fibrous material.

Another object of the invention resides in a method of attenuating streams of mineral material to fibers in separated groups and orienting the groups of fibers in coincident relation to form a depending multilayer veil which is continuously folded upon itself to form an insulating mat of many layers of the veil assembled in angular or echelon relation whereby the insulating characteristics of the mat are improved with a minimum of weight and thickness.

Another object of the invention is the provision of apparatus for continuously forming and collecting groups of fibers into individual layers and bringing the layers into contiguous relation and applying a comminuted or powdered binding material to the layers of fibers and vibrating or agitating the layers to facilitate the distribution of the binding material throughout the layers of fibers.

Another object is the provision of a fibrous mat of laminar construction wherein the layers or laminations are impregnated with a bonding material prior to their assembly into mat formation to secure substantially uniform distribution of the material throughout the laminar mat construction and thus attain a high degree of mass integrity without reducing the effectiveness of the insulating characteristic of the mat.

A further object of the invention resides in an apparatus embodying juxtaposed relatively movable fiber-collecting surfaces upon which layers of fibers are continuously deposited, the surfaces being movable in a direction or manner to bring the layers into contiguous relation to form a comparatively thin dual stratum or layer veil of fibers, the arrangement including means to fold or lap the stratum or layer upon itself to continuously and progressively form a laminar mat construction of a character wherein none of the fibers extend from one planar surface of the mat to the other.

Another object of the invention resides in a method of collecting attenuated mineral fibers upon a foraminous surface under the influence of reduced pressure to form a thin veil of fibers and wherein fibers that may be drawn through the foraminous surface are retrieved and returned to the fiber-collecting zone for refabrication.

Another object resides in a method and apparatus for applying a bonding material in comminuted form to an assemblage of fibers by directing an air stream in which the material is entrained through the assemblage of fibers while the latter is disposed in a substantially vertical position and agitating the assemblage to aid in the distribution of the material therein.

Another object of the invention resides in an arrangement of applying a binding material to a layer of fibers wherein excess binding material is retrieved and subsequently returned to the applying zone whereby substantially all of the binding material is effectively utilized.

Another object is the provision of a laminar construction of fibrous mat wherein the laminations are disposed in substantially parallel relation with respect to the major faces of the mat whereby the insulating characteristics are improved.

Still another object is the provision of a fibrous mat formed of two or more tiers or layers of fibers, each tier or layer composed of laminations or webs of fibers arranged in substantially parallel relation with respect to the major faces of the layer whereby a mat is formed having high insulating characteristics.

Another object of the invention is the provision of a method and apparatus for effectively cooling the veil or thin web of fibers prior to the application to the web of a thermocurable bonding agent or medium to avoid the heat setting or polymerization of the agent or medium in the veil prior to the laminating or mat-forming operations.

Another object is the provision of a method and means for progressively distending or stretching the veil or web of fibers as it travels from the fiber-forming and collecting zone to facilitate the impregnation of the veil or web with a binding agent or medium and to modify the orientation of the fibers in the web or veil which increases the strength thereof and fosters improved interfelting of the fibers in the laminating operation. This method results in increasing the sizes of the interstices between adjacent fibers in the veil and improves the insulation factor of the material.

Another object of the invention is the provision of a method and means for oscillating or swinging the web during lapping or mat-forming operations through the use of a multiplicity of gas or air blasts, the pressures of which may be controlled or regulated to secure proper oscillation of a comparatively wide web to attain proper positioning of the web as it is collected to form a mat.

Another object resides in a method and apparatus for forming a laminated mat of a multiplicity of thin layers of very fine mineral fibers whereby the orientation and interfelting of the fibers are improved and the resulting product is endowed with improved strength characteristics.

Another object resides in a method and apparatus for varying the effectiveness of suction or subatmospheric pressures existent at the web-collecting and laminating zones whereby the folds of the veil, during the lapping operations, are compressed by the differential pressures to form a laminated mat which is of substantially uniform thickness and density throughout its width.

Another object of the invention is the provision of a method of forming a mat from a thin web of fine fibers wherein the web is successively lapped upon itself adjacent a support through which suction or differential pressure is effective to compress and position each successive lap or layer of the web so that successive laps or layers are subjected to substantially the same differential pressure or suction at the deposition zone of the web whereby there is no increase in resistance to the passage of air through the web-collecting surface so that interfelting of the fibers and the density of the formed mat are substantially uniform. This method of forming a mat provides for effectively depositing the successive layers or laps of the web or veil with substantial uniformity and without any limitation on production speed in forming the mat as the effective suction or differential pressure acting through the web is the same irrespective of the speed at which the web or veil is lapped or the number of layers superposed in forming the mat.

Another object of the invention is a method of laminating a mat through the utilization of a thin veil of mineral fibers wherein the fibers may be produced by various methods of fiber attenuation.

Another object of the invention is the provision of apparatus for effectively impregnating a fibrous veil or web of substantial width with a bonding medium or agent whereby the bonding medium or agent is distributed substantially uniformly throughout the area of the veil or web.

Another object of the invention resides in a method of forming mineral fibers and fabricating a laminated mat therefrom wherein lubricant is introduced into the fiber-forming zone for direct application to the newly formed fibers and wherein the lubricant-impregnated mat may be heated to a temperature to cause migratory dispersion of the lubricant throughout the fibers of the mat, providing a high degree of mass integrity for the mat without the use of additional bonding mediums or agents.

Another object of the invention is a method of impregnating a veil or web of fine glass fibers with a bonding material in a manner whereby the web is subjected to suction or differential ambient pressure to convey or project the bonding material into the veil or web in a manner avoiding deposition or collection of the material on the walls of the suction tube or duct.

A further object of the invention is the provision of a method and means for entraining the bonding agent in a fluid stream for impregnating a fibrous veil with the bonding agent and regulating or controlling the pressure of the fluid stream at various zones to attain uniform distribution of the bonding agent in the veil or web of fibers.

Another object of the invention is the provision of a method and apparatus for introducing linear reinforcing material into the fiber-collecting zones in the form of continuous bundles of fibers, strands, threads or yarns for assembly with the webs or layers of collected fibers for imparting increased strength to the fibrous veil or mat.

Still another object is the provision of a method and apparatus for orienting continuous linear material as a reinforcement in the layers or webs of fibers in a manner whereby the strength characteristics of the layers or webs may be controlled in longitudinal and transverse directions.

The method of the present invention involves several steps or operations which are continuously carried on at successive stations and in the main includes the following: A furnace or apparatus for reducing fiber-forming material to flowable condition and flowing streams of the material to attenuating zones wherein the newly formed fibers are directed to juxtaposed collecting stations, the collected fibers being brought into a contiguous relation to form a dual-layered veil. The veil is moved to a zone at which a bonding material is applied to and distributed throughout the fibers, the binder-impregnated veil being acted upon by means effective to continuously fold or lap the veil upon itself into superposed layers in angular echelon pack or mass formation, the multilayered or laminar pack being sized and directed through a curing station or oven where the bonding material is set to form a mat endowed with a high degree of mass integrity.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which:

Figure 1 is a semidiagrammatic elevational view showing one form of apparatus for carrying out the method of producing fibrous mats;

Figure 2 is an enlarged end view of a portion of the apparatus of Figure 1 showing the fiber-attenuating blowers and means for applying lubricant to the fibers as they are formed;

Figure 3 is a side elevational view illustrating the fiber-collecting and binder-applying means;

Figure 4 is an end view of the fiber-collecting drums and driving means for elements of the binder-applying apparatus;

Figure 5 is a side elevational view of the binder-applying apparatus and the laminar pack supporting conveyor and associated mechanism;

Figure 6 is a fragmentary view of a portion of the opposite side of the pack-supporting conveyor;

Figure 7 is a vertical sectional view taken substantially on the line 7—7 of Figure 5;

Figure 8 is a vertical sectional view taken substantially on the line 8—8 of Figure 7;

Figure 9 is a vertical sectional view taken substantially on the line 9—9 of Figure 7;

Figure 10 is a side elevational view of the laminar pack supporting conveyor and felting rolls;

Figure 11 is a top plan view of the apparatus illustrated in Figure 10;

Figure 12 is an isometric view illustrating the orientation of the laminations in the pack;

Figure 13 is a longitudinal sectional view through a section of formed mat produced by the apparatus illustrated in Figure 1;

Figure 14 is a semidiagrammatic elevational view illustrating a modified form of apparatus for concomitantly forming a plurality of layers or veils and assembling them into a laminar multitier pack;

Figure 15 is a sectional view of a portion of the apparatus shown in Figure 14, the section being taken substantially on the line 15—15 of Figure 14;

Figure 16 is a longitudinal sectional view through a section of formed mat produced by the apparatus shown in Figures 14 and 15;

Figure 17 is a semidiagrammatic view illustrating another form of means for folding or lapping the veil in laminar pack configuration;

Figure 18 is a semidiagrammatic view illustrating a modified form of apparatus for producing a laminar mat of fibers;

Figure 19 is an isometric view illustrating the arrangement of laminations in the pack formed by the apparatus shown in Figure 18;

Figure 20 is a fragmentary view illustrating another mode of assembling the fibrous layer or veil into laminar pack formation;

Figure 21 is a semidiagrammatic view illustrating a modified form of the invention for forming a comparatively wide veil in producing a laminated mat;

Figure 22 is an end elevational view showing the apparatus for forming and treating the veil or web of fibers and for forming a laminated mat from the veil;

Figure 23 is a side elevational view of the apparatus shown in Figure 22;

Figure 24 is a side elevational view showing a portion of a suction box or chamber arrangement and control mechanism for the suction;

Figure 25 is a sectional view illustrating a form of suction control or distribution of the suction at the laminating zone;

Figure 26 is a detailed view illustrating a means for applying suction to the veil for impregnating the veil with binder;

Figure 27 is a sectional view illustrating the suction means of Figure 26 and the binder-discharging means;

Figure 28 is a sectional view through one of the veil-cooling devices;

Figure 29 is a semi-diagrammatic elevational view illustrating binder-distributing ducts;

Figure 30 is a view of the right end of the duct system shown in Figure 29;

Figure 31 is a view of the left end of the duct system shown in Figure 29;

Figure 32 is a plan view of the binder-distributing system of the invention;

Figure 33 is a sectional view taken substantially on the line 33—33 of Figure 23;

Figure 34 is an end view of a fiber-forming arrangement illustrating means for directing lubricant into the fiber-forming and collecting zone;

Figure 35 is a fragmentary view of portions of the fiber-collecting means illustrating collecting means for the veil of fibers;

Figure 36 illustrates a mechanical arrangement for forming fibers from heat-softenable material for producing a fibrous veil;

Figure 37 is a semidiagrammatic view of apparatus for forming fibers for the veil through the use of high velocity blasts of intensely hot gases.

Figure 38 is a semidiagrammatic view illustrating a method and means for introducing reinforcing material into the fiber-collecting zones for incorporation in the collected fibers;

Figure 39 is a vertical sectional view taken substantially on the line 39—39 of Figure 38; and Figure 40 is a semidiagrammatic view illustrating another method and means of assembling linear reinforcing material between the layers of fibers.

While the apparatus illustrated is especially adapted for forming mat constructions from fibers of glass, it is to be understood that the principles of the invention may be utilized for producing fibrous products from other fibers such as those formed from fusible rock or slag, thermoplastic resins and the like.

Referring to the drawings in detail and initially to Figures 1 through 11, the form of apparatus illustrated therein is preferably disposed within a suitable enclosure of building (not shown). Disposed in an elevated position as viewed in Figure 1 is a melting furnace 12 mounted upon a frame 14 and which is provided with a forehearth 16, the latter being equipped with feeders 18, there being four present in the illustrated embodiment of the invention. The feeders 18 are spaced as shown in Figures 1 and 2 and each is formed with a plurality of orifices adapted to flow two groups of streams of the molten fiber-forming material contained in the forehearth, the latter being supplied with material from the furnace 12. Disposed beneath the feeders 18 are pairs of forming hoods 20 and 21 into which the groups of streams are respectively directed. Positioned adjacent the upper ends of each of the forming hoods are blowers 22 adapted to direct blasts of gas downwardly into the forming hoods and into engagement with the streams of fiber-forming material which are attenuated by the velocity of the blasts into comparatively fine fibers which are conveyed downwardly through the attenuating zone or chamber defined by the walls of the forming hoods. A gaseous blast such as compressed air or steam under pressure has been found satisfactory for fiber attenuation for such materials as molten glass, slag or fusible rock.

It is desirable to apply a lubricant or sizing to the newly formed fibers to minimize interabrasion and this may be accomplished advantageously at the time the fibers are formed. For this purpose a plurality of lubricant-conveying ducts 23 may be disposed adjacent the blowers 22 provided with outlets for discharging lubricant into the forming hoods 20 and 21 onto the fibers.

The attenuated fibers entrained in the gaseous blasts are moved downwardly through a chamber 24 forming a part of the fiber-attenuating zone. Disposed beneath the fiber-forming hoods and chamber 24 is a fiber-collecting means including movable surfaces in the form of a pair of cylindrically shaped drums or members 26 and 27 provided with circumferential foraminous surfaces forming collecting zones upon which the fibers are deposited from the forming hoods 20 and 21. In the arrangement of the invention as shown in Figures 1, 3, 4, 7 and 8 of the drawings, the fibers from forming hoods entrained in the streams of attenuating gases are directed onto the drums to form individual, comparatively thin layers or webs 28 of fibers, one on each drum. The drums 26 and 27 are journalled on parallel axes and adapted for rotation in opposite directions whereby the layers 28 of fibers collected on each drum are moved thereby into contiguous relation to form a double layer veil or fibrous strip 29 which is continuously formed and discharged from the median zone between the drums.

The arrangement is inclusive of the establishment of a reduced pressure or suction zone within the drums effective to facilitate the deposition and collection of the fibers upon the foraminous surfaces of the drums 26 and 27 and to convey or carry away the spent gas such as steam or compressed air discharged from the blowers 22 for attenuating the streams to fibers. To this end a pair of ducts 30 and 31 are disposed adjacent juxtaposed ends of the drums which are Siamese coupled or merged into a single duct 32, the latter connected to a blower 34 preferably of the Sirrocco type, driven through a driving means or belt 35 actuated by an electrically energized motor 36.

The exit or outlet of the blower is connected with a vertically disposed duct 38 through which air and the spent gases of attenuation are conveyed upwardly, thence laterally and are discharged into a receptacle or cyclone 40 in a tangential direction, the receptacle being formed with a cylindrical portion 41 and an inverted conically shaped portion 42 providing a centrifugal type separator or cyclone effective to separate fibers from the air stream that may have entered the apertures in the foraminous surfaces of the collecting drums. The cyclone 40 is provided with a vent duct 44 for conveying the spent gas and air entering the drums into a chamber 46 having screened windows or openings 47 through which the gases from the receptacle 40 are discharged.

As will be seen in Figures 7 and 8, the ducts 30 and 31 project into the drums 26 and 27 substantially the full length thereof and are supported by journal blocks 47 respectively supported upon shafts 56 upon which the drums are journaled. The ducts are offset with respect to the axes of rotation of the drums in a direction of the fiber deposition zones so as to render the zone of reduced pressure or suction effective at the sectors of the drums upon which the fibers are collected. The walls of the ducts within the drums are provided with rectangular openings indicated at 48 so that the zone of reduced pressure or suction is effective only throughout that part of the circumference of the drums upon which the fibers are collected.

Provision is made for returning the fugitive fibers entrapped in the conically shaped portion 42 of the fiber-separating cyclone 40. To this end, a duct 45 connected to the apex of portion 42 is in communication with a small suction device or blower 49 adapted to establish an air stream for conveying the collected fibers in the portion 42 through a tube 50 which returns the fibers into the chamber 24 above the drums where such fibers are again deposited in layer formation on the drums concomitantly with the deposition of newly attenuated fibers from the forming hoods. Through this arrangement, substantially all of the fibers are utilized in forming the end product.

The ends of the drums opposite those in registration with the exhaust ducts 30 and 31 are closed by baffle plates 51. Each of the drums is supported at one end by means of pairs of supporting rollers 52 journaled upon frame members 54, the rollers being spaced as shown in Figures 4 and 7 to render the drums stable during rotation. The other end of each drum is provided with a shaft 56 secured to a hub 57 on the baffle plate 51, the shafts being journaled in bearings 58 and carrying sprockets 60 connected by a chain 61 with a driving sprocket 62 mounted on a shaft 63. The other end of the shaft 63 is provided with a sprocket 64 driven from a motor 65 for rotating the drums.

As shown in Figure 3, the chain 61 and sprocket arrangement is such that the drums are concomitantly rotated in opposite directions as shown by the arrows so as to carry or move the relatively thin layer or web 28 of collected fibers on each drum into contiguous relation at the median zone 75 between the drums.

The thin layers or webs of fibers, having been wetted by the lubricant and the condensation from the steam blasts utilized for fiber attenuation, tend to cling or adhere together as a dual layer or veil 29. In order to assure discharge of the veil 29 from the drums, a plurality of nozzles 76 shown in Figure 7 may be disposed at each side of the veil below the zone 75 to eject air under pressure with sufficient force to prevent the fibers from adhering to the drums and strip the veil therefrom.

Means are provided for applying or impregnating the dual layer fibrous web or veil 29 with a bonding material or binder of a character which may be heat cured or otherwise set to impart mass integrity to the mat or end product. While a binder in liquid form may be utilized for impregnating the veil either as it emerges from the drums or in subsequent lapped or laminar pack formation, it is preferred to utilize a dry binder in comminuted or powdered form as several distinct advantages accrue through the use of such a binder especially with a veil or web of comparatively thin character. When a wet binder or one in aqueous suspension is utilized, subsequently heat in large amounts must be applied in curing the binder in order to drive off or volatilize the liquid constituent.

The present invention embodies an arrangement whereby dry or comminuted binder may be uniformly distributed through the veil or web and any excess binder returned for reuse. As will be apparent from the drawings, the veil 29 moves downwardly in a substantially vertical plane. Arranged at each side of the veil and preferably one above the other are binder dispensers or applicators in the form of elongated tapered troughs 80 and 81; each of the troughs is formed with an elongated slot or opening 82 through which the powdered binder is discharged.

A binder-feeding means is provided and includes a supply hopper or receptacle 83 associated with a material metering and feeding mechanism 84 preferably of the electrically energized vibrator type adapted to deliver binding material continuously to the troughs 80 and 81 through the tubes 85. Any suitable propelling means may be utilized, as for example, a blower 86 for establishing an air flow through the tubes 85 entraining the binder and conveying same into the troughs 80 and 81.

Disposed respectively opposite the troughs are cylindrical rolls or drums 88 and 89 journally supported upon shafts 90 carried in suitable bearings, the rolls 88 and 89 having peripheral foraminous surfaces. Disposed respectively within the rolls are stationary ducts 93 and 94 which are connected with a suction device or blower 97 driven by a motor 98 for establishing subatmospheric pressures adjacent the veil and opposite each binder-dispensing trough, the suction or air movement being effective to carry the powdered binding material into the veil.

The excess binder which is carried through the veils enters the tubes 93 and 94 and is conveyed into a receptacle or cyclone 100 of the general shape and character of the cyclone 40 but of reduced size. Due to the whirling or turbulent action of the power-laden air in the cyclone 100, the particles of binder are discharged downward into the cone-shaped portion 102 and are collected in a bag or receptacle 104 situated at the apex of the cyclone. The receptacle 104 may be removed periodically from the cyclone and the retrieved binder returned to the hopper 83 for reuse. The cyclone 100 is provided with a vent duct 105 connected with a suction chamber 135 disposed beneath a conveyor 110.

A powdered binder that has been satisfactory in the above-described arrangement consists of a combination of Vinsol and phenol formaldehyde in the "B" stage. Vinsol is a thermoplastic resin separated as one fraction from the resinous material obtained by solvent extraction or steam distillation of southern pine while phenol formaldehyde is a thermosetting resin, the mixture of these constituents in the mat when cured imparting a high degree of mass integrity with a minimum amount of binder required. Furthermore the heat energy required to cure or set the binder is much less than heretofore required and hence the impregnated mat may be conveyed through the curing zone at increased speed to obtain higher production at decreased cost.

Other materials in powder or comminuted form may be utilized such as melamine, polyester or powdered rosin. It is to be understood that binders or adhesives may be applied in liquid or aqueous suspensions or solutions by spraying the same onto the veil in lieu of the powdered material.

The binder-impregnated veil 29 moves downwardly into engagement with a means for vibrating or agitating the veil to further distribute the binder more uniformly or homogeneously therethrough. One form of agitating means is best illustrated in Figures 7 and 9 and includes a pair of spaced parallel shafts 107, each supporting a veil-engaging element preferably of a flexible character. The veil-engaging elements 108 may each be formed of a sheet of elastomer such as rubber, synthetic rubber or the like configurated or supported to form a plurality of radially extending folds or loops which during rotation of the shafts 107 contact both major faces of the veil, agitating or whipping the same to effect uniform distribution of the binder and to facilitate movement of the binder to the interior of the veil.

The shafts 107 and the elements 108 carried thereby are driven from a speed-controlling or changing mechanism contained in the housing 69 through a chain and sprocket drive mechanism 112 as shown in Figure 4. The elements 108 additionally function to exert a pull or tension on the veil and provide an anchor or fulcrum for the veil as it is alternately moved in transverse directions during the folding or lapping of the same.

The binder-impregnated veil thereafter continues its downward vertical movement and is adapted to be deposited upon a suitable surface in a manner whereby the veil is folded or lapped upon itself to form a fibrous laminar pack. The apparatus is inclusive of means for causing lateral bodily movement of the veil, the extent of the lateral movement being substantially the width of the mat to be formed.

The downwardly moving veil is collected upon a relatively movable surface including a flexible conveyor 110, the upper flight of which is adapted to receive the veil folded or lapped upon itself. The means illustrated for causing the vertically and downwardly moving veil to be folded upon itself utilizes blasts of air alternately emanating from nozzles disposed at each side of the moving veil and arranged to effectively cause an undulating or swinging movement thereof to facilitate collecting the veil in multilayer or laminar pack formation.

As particularly shown in Figures 5 and 7, manifolds or pipes 115 and 116 are respectively disposed at opposite sides of the veil and are connected with a source of gas under pressure, as for example, compressed air, each manifold being provided with one or more nozzles for intermittently directing blasts against the veil. The pressure air delivered through the nozzles may be controlled by an automatically operated valve means 118 operated by a cam 119 which is constantly rotated by a motor 120 through suitable variable speed reducing mechanism contained in a housing 121, the cam being rotated at a speed proportionate to the linear movement of the veil so that the air valve directs air to one manifold and then to the other to successively cause the veil to be folded upon itself as shown in Figures 5 and 7 to provide a laminar pack 122 with the laminations disposed in angular echelon formation. The extent of undulatory lateral movement of the veil determines the width of the multilayer mat construction.

It is to be understood that the veil may be undulated by mechanical means or other mechanism adaptable to cause the veil to be lapped or folded upon itself. One form of means of this character is shown in Figure 17 and includes a traversing horn or guide member 123 supported by pivoted links 124 reciprocated by a pitman 125 and crank 126 actuated by a motor (not shown) or other driving mechanism. In this arrangement the veil depends through the horn 123 and is caused to be folded upon itself upon the conveyor 110 by lateral reciprocatory movements of the horn.

The conveyor 110, forming a surface upon which the veil is built up into pack formation, is mounted upon a frame 127 comprising side sections 128 joined together by transversely extending members. The frame 127 is provided at one side with a stub shaft 130 journaled in a bearing 131 mounted upon a relatively stationary support or frame structure 132 mounted upon the floor or other supporting surface. The axis of the shaft 130 forms a pivotal axis about which the conveyor frame structure 127, the conveyor arrangement 110 and mechanism associated therewith may be adjusted to obtain a particular angular position of the conveyor surface to accommodate the progressively thickening laminar pack during the deposition of successive folds of the veil upon the conveyor.

The conveyor 110 is of the foraminous type and disposed beneath the upper flight of the conveyor is a chamber 135 formed of sheet metal plates supported upon the frame 127, the chamber being provided with a cylindrical duct or tube 137 connected with a suction-producing device or blower (not shown) for establishing a subatmospheric or reduced pressure zone to facilitate the deposition of the veil upon the conveyor and is especially effective in holding the successive folds in their proper assembled relationship during formation of the pack. The portion of the duct 137 directly connected to the chamber wall is of rigid formation and is axially aligned with the stub shaft 130 and is supported upon rollers 138 journaled in bearings carried by a relatively stationary frame 139 as shown in Figure 6. This arrangement provides for concurrent movement of the chamber with the conveyor 110 when the latter is adjusted about the axis of the shaft 130. The portion 140 of the duct 137 shown in Figure 11 is of a flexible construction to facilitate relative movement of the chamber 135.

The conveyor 110 is mounted upon suitable sprockets or carriers 141 and 142, the shaft 143 supporting the carrier 142 being provided with a sprocket 144 connected by a chain 145 with a sprocket 146, the latter in turn being driven from a speed-reducing gear of adjustable character contained within a housing 147, the gearing being actuated by a motor 149 through a conventional drive arrangement.

Disposed above the upper flight of the conveyor and rearwardly of the zone of actual deposition of the veil of fibers upon the conveyor is a means for compacting or felting the several folds or layers of the laminar pack after the same move away from the veil collection zone. This compacting arrangement is inclusive of a frame structure 155 upon which are journaled spaced shafts 156 carrying an endless belt-like assembly of compacting or felting rolls 158.

One of the shafts 156 is equipped with a sprocket driven by the gearing of a variable speed reducer contained in housing 147' by a motor 161. Through the use of variable speed mechanism, the laminar pack felting rolls 158 may be driven at a linear speed coordinated with the linear travel of the conveyor 110. The frame 155 carrying the felting rolls 158 is supported for adjustment relative to the conveyor 110 to control the extent of felting or compacting of the laminations. As illustrated in Figure 10, such means may comprise bearing blocks 162 arranged for vertical slidable adjustment in frames or ways 163 by manipulation of the adjusting members 164.

The linear rate of travel of the felting rolls is preferably adjusted to a speed slightly greater than the linear or surface speed of the conveyor 110 to aid in compacting or folding in the upper edge portions of the laminations in forming a mat M from the laminar pack 122.

The frame 127 supporting the conveyor means 110 and the felting assembly is pivotally adjustable about the axis of the shaft 129 for the purpose of regulating the angular position of the upper flight of the conveyor. As illustrated in Figure 5, one form of adjusting means includes gearing 177 operated by a crank 178, the gearing being arranged to actuate a cable 179 connected to one end of the frame 127 for shifting the relative angular position of the conveyor 110.

It will be noted from Figure 5 that as the veil is folded in directions transversely of the conveyor 110 and as the conveyor moves in a righthand direction, the successive folds or thicknesses of the veil are stacked in echelon and are angularly disposed with respect to the plane of the conveyor 110. Thus it is necessary to adjust the conveyor 110 at a proper angle so that the folds or layers of the mat are disposed in a more nearly horizontal position so as to facilitate the assembly of the laminations and the felting or compacting operation.

The multilayered or laminar mat of fibers emerging from the compacting rolls 158 is projected onto a conveyor section 165 supported upon a frame 166. Journally mounted at the ends of the frame 166 are rollers 167 and 168 supporting the conveyor 165 which is driven by chain and sprocket means 169 from the shaft 143. Through the interconnected driving arrangement, the conveyor section 165 may be moved at the same rate of linear travel as the conveyor 110.

The frame 166 adjacent the roller 168 is articulately supported so as to accommodate angular adjustment of the conveyor 110. As illustrated in Figure 5, a strut or link 173 is pivotally connected to the frame 166 by means of a shaft 174, the lower end of link being pivotally connected as at 175 with a stationary member or support 176. Thus the angularity of the conveyors 110 and 165 may be changed but the fibrous pack or mat carried by the conveyors will be delivered from the righthand end of the conveyor 165 at substantially the same height above the floor.

The multilayer or laminar mat of fibers is discharged by conveyor 165 onto the upper flight of a movable conveyor section 180 mounted upon rollers 181 journaled upon a supporting frame 182. The conveyor 180 may be angularly disposed forming a ramp for elevating the mat for traverse to additional processing stations. The conveyor 180 may be driven by a motor 184 through a variable speed reducing mechanism 185 which in turn is operatively connected with one of the conveyor-supporting rollers 181. The speed-reducing mechanism 185 enables accurate control of the speed of the conveyor 180.

The mat M is discharged at the upper end of the conveyor 180 onto a belt-like platform 187 mounted upon rollers 188 which directs the mat between a pair of crushing rolls 190. The rolls 190 serve to break the fibers to reduce the resiliency of the mat and condition the fibers for the binder curing operation. The rolls 190 may be supported upon a frame 193 for adjustment in a vertical direction and are driven by a motor 195 through a suitable speed-reducing mechanism 196 of conventional character.

The compacted laminae of fibers in mat formation are discharged from the rolls 190 onto the upper flight of a conveyor section 198 which is driven at the desired speed by suitable means (not shown). The conveyor 198 delivers the mat construction onto a conveyor 200 which carries the mat through a curing zone or oven 202 at which zone heat is applied and the temperature of the oven maintained to set or cure the resin component or binding agent in the mat construction. The cured mat may thereafter be conveyed to suitable cutting devices for severing the same into desired lengths or sizes.

Figure 12 illustrates the angular echelon formation of the laminations or layers 205 of the veil 29 providing a laminar pack arrangement as they are collected upon the conveyor 110. Figure 13 is illustrative of a section of the completed mat M showing the angular orientation of the individual laminations 205 with respect to the major faces or surfaces of the mat. The angular positioning of the laminations eliminates the projection of individual fibers from one surface to the other in directions substantially normal to the mat surfaces so that the insulating characteristics of the mat are greatly improved. While the surface fibers of the individual juxtapositioned laminations are in a measure felted by the felting rolls 158 and the sizing rolls 190, the individual fibers of one lamination do not project through adjacent laminations.

The operation of the hereinbefore described apparatus in carrying out the method of the invention is as follows:

Molten or flowable fiber-forming material, as for example glass, which has been melted in the furnace 12 flows to the forehearth 16 and is continuously discharged in a plurality of fine streams through the openings in the feeders 18. Concomitantly lubricant is discharged from the manifolds 23 into the forming hoods for lubricating the fibers and blasts of steam or other gas under pressure discharged from the blowers 22 are directed into the forming hoods or chambers 20 and 21 in the general direction of the flow of the glass streams engaging and attenuating them to fine fibers which travel downwardly through the forming hoods and are deposited in comparatively thin layers or webs upon the foraminous surfaces of the rotating drums 26 and 27. The suction or reduced pressure within the drums set up by the blower 34 facilitates the deposition of the fibers in substantially uniform layers and further serves to hold the fibers to the surfaces of the drums throughout a partial rotation thereof. The suction apparatus also carries away the spent steam and air which enters the forming hoods above the blowers 18. The fibers are formed and collected at a rate to form the thin web or veil which offers little resistance to the flow of air through the perforations in the drum; hence, there is a tendency for some of the fibers to be sucked through the perforations into the air stream and be conveyed through the duct 38 to the cyclone type separator 40. The rotation of the gases in the cyclone effects a separation of the fugitive fibers which are thrown out of the air stream and gravitate into the apex of the cyclone and are entrained in an air stream developed by a small blower 49 which returns such fibers through the duct 50 to the forming hoods for redeposition upon the collecting drums. By this means fibers that might otherwise be lost are retrieved and eventually incorporated into the mat construction. Any fibers which may remain in the air stream in the cyclone 40 are conveyed to and entrapped in the screened chamber 46.

The comparatively fine webs of fibers collected upon the drums are moved by the drums into contiguous or parallel relation to form a dual-layered web or veil of comparatively thin character. The veil 29 moves downwardly in a vertical path through the binder-applying station where binder is projected into the veil from the applicators 80 and 81. The interiors of the foraminous cylindrical members 88 and 89 are under the subatmospheric or reduced pressure which facilitates movement of the powdered binder through the veil from each side thereof.

The excess binding agent which passes through the veil is conveyed through ducts 93, 94 by an air stream produced by blower 97 into a cyclone or separator 100 where the powdered binder is separated from the air stream and collects in the receptacle 104 disposed at the lower end of the cyclone.

The powder-impregnated veil is continuously moved into engagement with the agitating or vibrating means 108 which agitates the veil to more uniformly distribute the powdered binder therethrough. As the veil moves away from the agitator 108 a means or force is effective to undulate or swing the veil in a to-and-fro movement, the agitating means serving as a fulcrum or anchor about which the veil swings in its transverse reciprocatory movement. The air jets 115 and 116 direct blasts of air periodically in alternate directions to cause the undulating movement of the veil. The veil is collected upon the moving conveyor 110, the speed of which is coordinated with the linear rate of movement of the veil and the extent of the undulation or swing whereby the veil is folded upon itself in multilayer pack formation shown in Figure 12. The laminar pack 122 is conveyed beneath the ironing or felting rolls 158, the compressed pack or mat of fiber layers thereafter being conveyed successively by conveyors 165, 180 and the movable platform 187 to the crushing rolls 190. The mat is conveyed by conveyor 198 to the binder-curing oven or zone 202 where the application of heat effectively sets or cures the binder to impart mass integrity to the mat. The method of applying the binder to the relatively thin veil or web provides a substantially homogeneous disposition of the binder throughout the mat so that there are no zones or areas of concentration or excesses of binder.

The utilization of a powdered or comminuted binder secures certain advantages and economies over prior methods of binder application as the absence of an aqueous suspension or solution effects a substantial saving in the amount of heat required to cure the binder as there is an inappreciable amount of water to be volatilized and driven off in the preferred method of utilizing powdered binder. Another advantage flowing from the use of powdered binder resides in the application of the binder outside of the forming hoods and steam distillation of the binder is thus avoided.

The method is however readily adaptable to the utilization of binders in aqueous solutions or suspensions as the binder may be sprayed onto the veil or web during its vertical movement at substantially the same zone that the powdered binder is applied. When such resin solutions or suspensions are employed, the resins may have a lower aqueous dilutability and relatively high solids content. For example, a resin such as phenol formaldehyde in the "B" stage with water as a carrier may be sprayed onto the veil and good distribution obtained because of the thinness of the veil. The decrease in the amount of water used enables the use of a curing oven of reduced size as less heat is required in the curing zone.

The product produced by the form of the invention hereinbefore described is shown in Figure 13. The method of folding the veil or web upon itself transversely of the direction of movement of the conveyor upon which the veil is deposited establishes the folds at the transverse edges of the pack or mass. After the mat of fibers has passed through the crushing or sizing rolls 190 and has passed through the curing oven or zone, the edges may be trimmed or sheared by means (not shown) which removes the bight portions of the folds providing a mat having smooth, neat-appearing edges. It is to be understood that the mat may be cut or severed by well-known conventional means into any desired shape or size depending upon its installation or the purpose for which it is used.

Figures 14 and 15 illustrate in semidiagrammatic form a modification of an apparatus for carrying out the method of the invention. This modification is directed to the method of forming dual webs or veils and depositing them concomitantly to form a laminar mat or product. The melting tank or receptacle 212 is provided with a forehearth 216 provided with groups of feeders 128 from which flow groups of streams of glass or other fiber-forming material. Disposed beneath the groups of feeders are forming hoods or chambers 220 in which the streams are attenuated to fibers by engagement of blasts of steam or air emanating from blowers disposed at the upper ends of the forming hoods.

Disposed beneath the groups of forming hoods are dual pairs of drums 226 and 227 having foraminous surfaces upon which the fibers are deposited in thin layers or webs, one on each drum. The drums are of substantially the same construction as those described in connection with the form of the invention shown in Figure 1.

The layers or webs of fibers formed on the respective pairs of drums when brought into contiguous relation form independent veils or dual layers of fibers 229 and 229', a binding agent being applied to each veil in the same manner as hereinbefore described by means of pairs of binder-dispensing troughs 280 and 281 and associated suction means for causing the powdered binder to be moved through the veils. Disposed beneath the binder-applying zones of each veil or fibrous layer is a pair of corrugated members 308 preferably formed of loops of resilient or elastomeric material such as sheet rubber which serves to agitate or vibrate the veils for securing effective distribution of the binder therein and to form a fulcrum or anchor from which the veils may be undulated by air jets 315 disposed at opposite sides of the veils.

The blasts of air from the jets or nozzles 315 cause a concomitant deposition of both veils or layers upon the conveyor 110, the veils being folded back and forth transversely of the longitudinally moving conveyor to form two superposed laminar packs, the laminations of each pack being angularly arranged with respect to the conveyor surface. This arrangement thus produces two tiers or strata 305 and 305' in superposed relation wherein the individual laminations of each tier extend angularly or diagonally relative to the major faces of the mat and through substantially one-half the thickness thereof. The mat or product M' formed by this method of assembly of a plurality of veils is illustrated in Figure 16.

The laminar pack 322 formed by two tiers of dual veils in lapped assembly is processed in the same manner and by the same apparatus shown in Figure 1 and hereinbefore described, the pack being moved beneath ironing or felting rolls 158 and through crushing or sizing rolls 190 and into a curing oven or zone 202 to produce the mat M' shown in Figure 16. It will be apparent that none of the fibers adjacent the major faces extend through the mat and hence the insulating value of the mat is thereby greatly improved. In carrying out this method, the apparatus preferably includes the adjuncts shown in Figure 1 such as the fiber-recovering cyclone 40, the binder-recovering cyclone 100 and the sequentially arranged conveyors 165, 180, 187 and 198 and associated elements and driving mechanism.

Figure 18 illustrates in semidiagrammatic form an apparatus for carrying out the method of the invention wherein two dual stratum veils 429 and 429' are brought into contiguous relation before they are assembled in a laminar pack or mat formation. In this form of apparatus, two pairs of drums 226' and 227' provide dual pairs of fiber-collecting surfaces arranged to form thin webs or layers of fibers attenuated in forming hoods 220' and 221' disposed above the respective pairs of drums. The webs or layers of fibers of each pair of drums are moved in directions to concomitantly and continuously form two independent veils or webs 429 and 429', each of dual thickness by reason of the combining of the layers of fibers from each pair of drums.

The binder may be applied in the same manner as the form of the invention hereinbefore described, there being a binder-applying means for each veil as illustrated at 480 and 481. The binder may be applied immediately beneath the pairs of fiber-collecting drums 226' and 227', the veils being thereafter brought into contiguous relation by means of guide rolls G. The veils, when brought into contiguous engagement, form a quadruple-layered or composite veil 529 which may be passed between corrugated rolls 108 of the same construction as those illustrated in the other forms of apparatus hereinbefore described. The corrugated members cause an agitation or vibration of the veils for attaining more uniform distribution of the binding agent through the multilayered veil as well as to provide a fulcrum or anchor from which the veil may be undulated in directions transversely of the conveyor upon which the veil is deposited under the influence of blasts of air emanating alternately from jets 115 and 116 forming a laminar pack.

The form of laminar pack 422 resulting from this method is illustrated in Figure 19 and the mat formed therefrom is endowed with substantially the same advantageous characteristics as the other forms of product disclosed. There are no fibers in the finished mat that extend continuously through the mat from one major face to the other in directions normal to the faces.

The laminar pack 422 formed by means of the apparatus shown in Figure 18 is processed into a mat in the same manner as hereinbefore described wherein the laminar pack is passed through felting rolls thence into a curing zone or oven and the mat or end product trimmed and cut to desired dimensions.

Figure 20 illustrates an arrangement for lapping or folding the veil or web upon a collecting conveyor in directions longitudinal of the conveyor. In this form of construction for carrying out this purpose, the fiber-collecting drums 26a and 27a are journaled about axes extending in parallelism and transversely of the collecting conveyor 110. The binder may be applied in the manner hereinbefore described by means 80 and 81 and the veil moved between corrugated rolls 108 which are disposed with their axes also extending transversely of the conveyor 110. Air jets 115 and 116 may be utilized, disposed respectively at each side of the veil, for effecting an undulating or swinging movement of the veil whereby it is deposited in a continuous series of laps or folds forming a laminar pack 522, the bight configurations 523 of which lie transversely of the conveyor as illustrated in Figure 20. The conveyor 110 moves the laminar pack assembly 522 into engagement with the compacting or felting rolls 158 which compress or flatten the laminae or layers of the pack into a more dense mat. The laminar mat, after passing the felting rolls, is conveyed through the crushing or sizing rolls and thence to a curing oven in the manner hereinbefore described after which the edges of the mat may be trimmed and the mat cut to desired size or shape.

It is to be understood that other means or apparatus for forming the fibers from fiber-forming material may be employed such as a centrifugal mechanism wherein a stream of molten glass is caused to flow into a rapidly rotating, substantially horizontal disk or wheel equipped to cause rapid radial movement of the fiber-forming material in fine streams which are attenuated to fibers by centrifugal forces set up by the rapidly rotating disk. The fibers so formed may be collected upon relatively movable surfaces in thin layers or webs and processed according to the herein described method to a laminar mat construction.

A modified form of the invention is shown in Figures 21 through 33. The form of apparatus shown in these figures is particularly adapted for carrying out the method of forming a veil of considerable width for use in making a laminated mat. It has been found in practice that this form of apparatus is especially effective in producing a veil of twelve feet or more in width and, hence, a veil of this considerable width, when laminated into mat form, provides a product wherein the individual laps or laminations extend through a greater length of the mat, providing a mat having improved strength characteristics.

The fiber-forming means illustrated in Figure 21 is of the general character shown in Figure 1 and includes a forehearth 550 connected with a melting furnace 551. The bottom wall of the forehearth is equipped with two laterally spaced rows of feeders or bushings 553 for delivering groups of streams 554 of glass or other fiber-forming material from the forehearth. Disposed beneath the feeders 553 are spouts 55 communicating with a forming hood or chamber 556 and disposed above the spouts and forming hood is a plurality of blowers 558 individual to the groups of streams adapted to direct blasts of gas, for example, steam or compressed air, downwardly into the spouts and forming hood 556 and into engagement with the groups of streams 554 of glass which are attenuated by the velocity of the gaseous blasts into comparatively fine fibers which are conveyed downwardly by the blasts through the fiber-attenuating zone or chamber defined by the spouts and forming hood. The fibers so attenuated and entrained in the blasts are collected upon the peripheries of cylindrically shaped members or drums 560 and 562 in individual groups or layers 563 and 564. The drums revolve in opposite directions to move the collected fibers into a single veil or web 572 at a zone 568 between the cylindrical members.

A lubricant or sizing is applied to the newly formed fibers and preferably delivered downwardly into the forming hood 556 in engagement with the fibers through lubricant-conveying and discharging tubes 565 which are disposed above blowers 558 as shown in Figure 21. By introducing lubricant into the fiber-forming zone from a position above the blowers, it is found that the lubricant or oil substantially completely coats the fibers and that a uniform distribution of lubricant throughout the fibers in the forming hood is obtained.

The peripheries of the fiber-collecting surfaces or drums 560 and 562 are foraminous or perforated and disposed interiorly of each of the collecting drums is a substantially rectangular suction box or chamber 566, each of the suction boxes having an opening adjacent a portion of the peripheral area of the proximate drum to render the suction effective through the perforated area of the drum bounded by a wall of the forming chamber 556 and a horizontal plane through the axis of the drums. By this means, the area of each drum directly beneath the forming hood 556 receives the fibers from the forming hood in two individual layers or groups 563 and 564, one formed on each drum, which are held to their respective drums by the suction or differential pressure until they reach the zone 568 at the terminus of the suction areas effective through the drums.

Connected to the suction chambers 566 are individual ducts 570 which are merged adjacent the drums into a single duct which is connected with a suitable blower for establishing suction or subatmospheric pressure within the suction boxes or chambers 566 in the same manner as in the construction shown in Figure 1. The suction is effective to continuously collect and retain the attenuated fibers upon portions of the peripheries of the drums in the form of independent layers which upon rotation of the drums are brought together at the zone 568 to form the dual-layered veil or web 572.

The drums 560 and 562 are supported and guided by groups of rollers 574 journaled in suitable bearings carried by the frame structure of the apparatus and are driven by chains 575 and 576 which are driven by sprockets and chains from a motor 720 shown in Figure 22.

The veil 572, formed by the groups of fibers brought together by the drums, travels downwardly through cooling zones for reducing the temperatures of the fibers and thence through binder-applying zones. As particularly shown in Figures 22 and 23, the cooling means includes two cylindrical drum-like members or rolls 578 and 579, each being provided with a foraminous or perforated periphery. Disposed within each of the rolls is a tube or duct 581 which is relatively stationary and which is provided with longitudinal opening or slot 583 through which air may flow as shown in Figure 28. Each of the ducts 581 is fixedly supported within its adjacent roll and exteriorly of the rolls 578 and 579 are connected together in a single duct 582 which is in communication with a suitable blower arrangement 584 for establishing a suction or subatmospheric pressure within each of the ducts 581 so as to cause air to flow through the foraminous surfaces of the rolls into the ducts 581.

The rolls 578 and 579 are journaled in suitable bearings and are equipped with sprockets driven by a chain 585 from the motor 720. As shown in Figure 22, the veil-contacting rolls are disposed at different elevations with the foraminous peripheries of the rolls being positioned to engage the veil or web 572 formed of layers of fibers from the collecting drums 560 and 562. Continuous suction applied to the ducts 581 is effective to cause flow of air through the perforated surfaces of the rolls and through the openings 583, the air being moved through the veil or web as it travels downwardly in engagement with the roll surface.

It has been found desirable, in order to attain better orientation of the fibers in the web or veil, to effect a distention or stretching of the veil as it moves toward the lapping station. The rolls 578 and 579 are therefore driven at a speed whereby their peripheries move through a linear distance of approximately 1% greater than the linear travel of the peripheries of the collecting drums 560 and 562. With this differential in linear speed of the collecting rolls and the collecting drum surfaces, the formed web 572 is stretched, distended or elongated from its zone of formation indicated at 568. Thus, as the veil moves through the cooling zone provided by the suction established in tubes 581, a continuous flow of air is maintained through the web or veil, lowering the temperature of the fibers to prevent the heat in the fibers from prematurely curing or setting the binder as it is applied to the veil or web.

The cooled veil or web is moved through a zone at which a bonding medium or material is applied thereto. In this form of the invention, there is illustrated four binder-applying stations, two stations being disposed at each side of the veil and vertically spaced one from another. There are disposed at each side of the veil, binder-distributing ducts arranged in pairs.

The method of applying binder to the veil in this embodiment of the invention includes entraining comminuted or powdered binder in an air or gas stream and discharging the binder into opposite sides of the veil adjacent suction devices alternately disposed at opposite sides of the veil in a manner whereby suction facilitates the impregnation or penetration of the veil with the binder, the binder being filtered out of the air or gas stream by the veil. As shown in Figures 23 and 29 through 33, there are two binder-applying or discharging troughs at each binder-applying station; hence, there are eight troughs disposed in pairs, there being two pairs at each side of the veil.

As shown in Figure 29, each of the ducts 597 for conveying binder to the veil is connected with a trough 596 which is provided with a slot 605, shown in Figure 27, extending over substantially one half of the width of the veil. Each of the ducts or tubes 601 is equipped with a trough 595 which overlaps an adjacent trough 596 and is provided with a slot which extends over the remaining half of the veil. It should be noted that the trough portions 595 and 596 are of tapered construction so as to facilitate distribution of the binder through the slots at a substantially uniform air or gas pressure effective throughout the length of the slots.

As shown in Figures 29 through 32, there are four sets of binder-distributing troughs 595, 596, two sets at each side of the veil, each set being disposed adjacent a suction device 610 with the veil vertically disposed between each suction device and the adjacent set of binder-distributing troughs. The pairs of binder-conveying tubes 597 are merged into ducts 632 and 634, and the pairs of ducts 601 are merged into ducts 636 and 638. The ducts 632, 634, 636 and 638 are connected with a binder supply 640 for introducing the binder into the distribution system. The binder is preferably in the form of a fine powder and is entrained in an air stream. The air stream is established by means of a blower 644 which conducts air under pressure through duct 645 into the binder supply 640 wherein the binder is entrained in the air stream and is carried through the duct system hereinbefore described to the binder discharge troughs 595 and 596. It has been found desirable to cool the air used for the binder-conveying medium in order to avoid liability of caking of the binder in the duct system due to condensation which may form in the duct system under variations of temperature. Hence the air taken into the binder-distributing system is passed through an air cooler 647, the cool air being conveyed to the blower by a tube 648.

Each of the suction devices 610 includes a foraminous roll or drum 611 which is revolubly supported for contact with the veil as it moves downwardly. Disposed within each of the rolls 611 is a relatively stationary sleeve 616 which is mounted upon or carried by a tube 618. The tube 618 is provided with an extension 619 which is secured to supporting cross members 621 of a frame structure by means of U-shaped retaining bolts 622 which are secured to the cross members. Each tube 618 and the adjacent fitting or extension 619 are connected with a duct system in which is impressed suction or subatmospheric pressure by means of a suitable blower (not shown).

As shown in Figures 26 and 27, the sleeve 616 and tube 618 of each suction device are provided with registering slots 620 forming a passage through which the suction or subatmospheric pressure in tube 618 is effective to draw the binder discharged from the slots 605 of the binder-applying devices into the veil.

Each roll 611 is journaled upon the fittings or extensions 619 by means of antifriction bearings 612, one of which is shown in Figure 26. One end of each of the rolls 611 is provided with a sprocket 614 driven by suitable chain means as shown diagrammatically in Figure 22.

The revoluble rolls or drums 611 of the binder suction devices are driven at progressively increasing speeds with the lowermost roll traveling at the greatest speed. The four rolls 610 are respectively provided with drive sprockets 650, 651, 652, and 653, sprocket 650 being the largest and sprocket 653 being the smallest, so that each succeeding roll 611 rotates at a progressively increased speed over the next preceding roll. Thus, the rolls successively engaging the veil exert a frictional component on the veil to effect a stretching or distending of the veil. It has been found that the veil may be stretched from 2% to 10% from the zone of its formation at the bite of the fiber-collecting drums to the lowermost suction roll 610 and that such elongation or stretching facilitates the movement or passage of the binder into the veil and also reorients the fibers, improving the strength characteristics of the veil. An elongation of approximately 4% has been found to be satisfactory.

Disposed beneath the lowermost suction roll 611 and the adjacent binder-applying station is a veil-vibrating means including a pair of members 657, preferably of resilient material such as rubber, shaped with radially extending portions which, during rotation of the members, engage and agitate or vibrate the veil to further enhance the distribution of the binder in the veil.

As the veil moves away from the members 657, it is swung or oscillated in alternate transverse directions to form a laminated pack upon a collecting surface provided by a relatively movable foraminous conveyor 660. The conveyor 660 is mounted upon suitable driving rolls, one of which is shown at 662 in Figure 23, the conveyor being inclined downwardly in the direction of movement of the pack or mat during its formation on the conveyor. The inclination of the conveyor is essential to the satisfactory formation of a laminated mat of the character shown herein as the laps of the veil must be deposited upon the accumulated layers or laminae in a horizontal plane substantially parallel with the axis of the fiber-collecting drums. Otherwise, it has been found that the individual folds or laps will not be deposited properly and the laps will be wrinkled, impairing the interfelting of the fibers of the individual layers of the veil in the mat.

The veil is oscillated during the mat-forming operation by means of gaseous blasts, such as air blasts, alternately effective at opposite sides of the veil in proper, timed relation to cause the veil to be lapped upon itself as it is deposited upon the moving foraminous conveyor 660. In effecting a lapping of a veil which is several feet in width, it has been found desirable or necessary to vary the effective veil-oscillating force acting at different zones against the veil in order to secure proper lapping thereof in the formation of a pack or mat. Thus, the air blast or blasts directed at the central zone of the veil should be less effective or of less pressure than at the adjacent zones as otherwise there is a tendency to expand or stretch the veil at the central zone, causing a thinning of the veil at the central zone and an uneven lapping of the veil.

As particularly shown in Figure 23, there are three sets of nozzles disposed at each side of the veil from which air blasts are projected. Frame members 664 and 665, shown in Figure 22, provide supports for the means carrying the nozzles from which the air blasts are projected. Secured to the support 664 are three vertically disposed members 668 spaced in the manner shown in Figure 23. The members 668 are provided respectively with fittings 670 which are adjustably mounted upon the members, the fittings 670 respectively supporting tubes or ducts 672, 673 and 674 which are connected with a source of compressed gas or air through pipes 676.

Each of the tubes 672, 673 and 674 is provided with a pressure-regulating means 680 for regulating or controlling the gas or air pressure to each of the tubes 672, 673 and 674. The latter tubes are connected with pipes 682, 683 and 684, respectively, which are arranged in the manner shown in Figure 23 at one side of the veil. Each of the tubes is provided with a series of nozzles or orifices 686 through which gas or air under pressure is discharged against the veil. The tubes or pipes 676 are connected together and to a valve means (not shown) actuated periodically to cause air pressure to be extruded from the nozzles 686 against the veil to move or swing the same in a lateral direction to deposit a fold or lap upon the conveyor 660.

Disposed at the opposite side of the veil is an arrangement identical with that above described, including three sets of tubes of identical construction with the tubes 682, 683 and 684 which are connected to a valve device (not shown) periodically opened to direct pressure air or gas from the nozzles, causing the veil to swing in the opposite direction to form a succeeding fold or lap upon the laps collected upon the conveyor 660.

Thus through the individual regulating devices 680, the air blasts projected from the nozzles of the pipes 682, 683 and 684 may be adjusted to cause a uniform swinging movement of the veil in alternate directions. In practice, it has been found that the blast from the nozzles of the intermediate tube 683 should be of lesser pressure than the blasts projected from the tubes 682 and 684 to prevent or avoid ballooning of the central portion of the veil.

This embodiment of the invention may also include means for creasing the folds of the laps in the mat. As shown in Figures 22 and 23, a shaft 690 is journaled in bearings 692 and 693 and is equipped with miter gears 695, 696 and 697. The miter gear 695 meshes with a miter gear 698 mounted upon a shaft 699 which is driven by a chain and sprocket arrangement through a variable speed-changing device 702 operated by another speed-changing device 707. The shaft 709 of the device 707 is driven by a chain 711 engaging a sprocket 712 on shaft 709, the chain being driven from a sprocket 714 mounted upon a shaft 715. The shaft 715 is equipped with a sprocket 717 which is driven by a chain 718 taking over a pulley 719 mounted upon a shaft of the motor 720. Mounted at right angles to the shaft 690 are shafts 724 journaled in suitable bearings 725. Each of the shafts is provided with a disc-like member 727 and each member 727 supports an arm 729. The extremities of each of the arms 729 journally support a roller or member 730 for creasing or pressing the folds of the veil at opposite sides of the pack or mat as the veil is deposited in successive layers or laps. The creasing rolls 730 are arranged 180° apart so that when a fold at one side of the mat is being creased by one of the rolls, the other is in a position to permit the swinging of the veil to form the succeeding fold in the veil. By this means, each fold in the veil is creased as each layer of the veil is deposited upon the preceding layers. The arms 729 carrying the creasing rollers 730 may be adjusted radially of the disc-like members 727 to facilitate proper engagement of the roller with the veil layers on the conveyor 660.

Disposed beneath the conveyor 660 upon which the veil is accumulated in successive layers is a suction means to cause the veil to be forced toward the conveyor into contiguous relation with the preceding layer. In the illustrated embodiment, two suction chambers, designated 735 and 736, are preferably employed which are connected to a suction-producing means or blower (not shown) by means of ducts 737 and 738.

As particularly shown in Figures 24 and 25, the suction chambers 735 and 736 are defined by sheet metal walls and are disposed in abutting relation longitudinally of the conveyor 660 in the manner shown in Figure 23 to establish zones of suction or subatmospheric pressure over an area of the mat-supporting conveyor at least equal to or exceeding the width of the veil and the transverse dimension of the laps. Each of the chambers is equipped with a means for varying the effectiveness of the suction transversely of the conveyor 660. Such means has been found to be desirable in establishing a more effective suction at the edge zones of the accumulating layers of veil than at the central zone and thus facilitate the production of a mat which will be of substantially uniform thickness transversely of the direction of movement of the mat.

The suction chambers 735 and 736 are each provided with pairs of adjustable valves, baffles or members for varying the effectiveness of the suction transversely of the conveyor 660. Disposed adjacent the end walls 740 and 741 of the chamber 736 are brackets 743 and 744 as shown in Figure 24. The brackets support upwardly extending members 745 which are provided at their upper ends with sets of hinges 747 and 748. The hinges 747 form a pivotal support for a valve member or baffle 750, the sets of hinges 748 forming a pivotal support for a similarly shaped valve or baffle 751. It will be seen from Figure 25 that the member or baffle 750 has a uniplanar portion 753 and a curved terminal portion 754. The valve member 751 is of a similar shape and extends in a righthand direction as viewed in Figure 25. The hinged supports of the valve members or baffles 750 and 751 are disposed centrally of the chamber and adjacent the conveyor 660 so that the planar portions of the members, when in the full-line positions as shown in Figure 24, serve to reduce the effectiveness of the suction at the central zone of the conveyor 660. The baffles 750 and 751 are adjustable about the axes of the hinges 747 and 748 to vary the effective suction over the conveyor area.

Means are provided for regulating the relative positions of the valves or baffles. As shown in Figures 24 and 25, each valve or baffle is provided with diagonally disposed bracing bars 756 and spacing struts 757 to maintain the proper shape or configuration of the sheet metal valve member subjected to the pressure of the moving air stream established by the suction means. Secured to one of the reinforcing bars 756 is a bracket 758 which is pivotally connected by a pin 759 with one end of a manipulating means or lever 760 which is pivotally supported or fulcrumed on a pin 762 carried by a bracket 763. The lever 760 is formed with a slot 764 to accommodate a bolt 765 which extends through the slot 764 and through a slot 767 formed in the bracket 763, the bolt being equipped with a nut which may be drawn up to hold the lever 760 in an adjusted position and, hence, serves to hold the valve or baffle 750 in an adjusted position.

As shown in Figure 25, the baffle or valve member 750 is so shaped as to render the suction existent in chamber 736 more effective at the edge zones of the foraminous conveyor 660 than at the central zone. Thus, by providing more effective suction at the edge zones where the veil or web is folded upon itself during formation of the laminated pack or mat, the suction greatly assists in bringing each succeeding fold or lap into contiguous relation with the adjacent lap to cause an interfelting of the fibers of the contiguous surfaces of adjacent laps.

The baffle or valve member 751, a portion of which is shown in Figure 25, is also provided with manipulating means (not shown) of the character above described for adjusting same to vary the effectiveness of the suction in the lefthand zone of the foraminous conveyor as viewed in Figure 25.

The suction chamber 735 is also provided with valve members or baffles of the character illustrated at 750 and 751 for varying the effectiveness of the suction at the edge zones of the conveyor 660 adjacent the chamber 735.

While the suction means effective beneath the conveyor 660 is formed in two chambers 735 and 736 in order to obtain better distribution of the differential pressure or suction lengthwise of the conveyor, it is to be understood that a single chamber may be used, if desired.

Mechanical means is provided for compressing the laps or folds of the laminar pack carried on the conveyor or collecting surface 660 to establish and control the thickness of the mat formed from the laminations or layers and to further interfelt the fibers of the contiguous surfaces of adjacent laps or folds. A form of apparatus for accomplishing this is illustrated in Figure 21. A shaft 775 is disposed above and transversely of the direction of movement of the conveyor 660 and the laminar pack formed thereon, the shaft being driven by suitable means (not shown). Mounted upon the shaft 775 is a pair of spaced disk-like members 777, one of which is shown in Figure 21, each of the members supporting a plurality of radially projecting arms 779 substantially equally spaced circumferentially relative to the shaft 775. Each pair of radial arms 779 supports a roller 782 provided with tenons mounted in bearings carried by the arms, the rollers being journaled for rotation in the bearings. The rollers or members 782 are adapted, upon rotation of the shaft 775, to successively engage the upper zones of the laps or folds of the laminar pack to compress the same to provide a mat 784 of predetermined thickness, depending upon the relative vertical position of the rolls 782 above the pack. The shaft 775 is driven in a counterclockwise direction, as viewed in Figure 21, at a speed such that the rollers 782 move at a circumferential speed about the axis of the shaft 775 slightly greater than the linear speed of the laminar pack on the conveyor so that the rollers 782 tend to draw the laps or layers in the direction of movement of the pack to smooth the laps or layers as well as to compress the pack. After the mat 784 is thus formed, it is conveyed to an oven or binder-curing zone of the character shown at 202 in Figure 1 for setting up or curing the binder in the mat.

In order to secure a satisfactory fiber orientation and minimize abrasion, it is imperative to distribute a lubricant or sizing through the newly formed fibers concomitantly with their collection into webs or layers on the collecting drums. Figures 1, 2 and 21 illustrate an arrangement wherein lubricant is introduced into the fiber-forming zone above the blowers which provide the attenuating blasts for forming the fibers. Figure 34 is illustrative of an arrangement for introducing lubricant or sizing into the fiber-forming chamber or hood by means of suitable jets or nozzles. Thus, a fiber-forming chamber 556' disposed above the fiber-collecting drums 560 and 562 is provided with a series of lubricant dispensers or nozzles 788 carried or mounted in suitable openings in the walls of the forming hood 556'. Thus the plurality of lubricant dispensers 788 project or spray a suitable lubricant or sizing onto the fibers as they are produced in the forming chamber or hood 556'. Additional lubricant or sizing may be projected from one or more lubricant dispensers 790 disposed in the crotch or juncture of walls 792 of the spout formations disposed adjacent the glass stream feeding means 553 of the forehearth 559. The dispensers or nozzles 790 are disposed to direct oil or sizing onto the layers of fine fibers on the collecting drums 560 and 562 as the layers move into contiguous or contacting relation at the bite zone between the fiber-collecting drums.

It has been found that a fibrous product having a fair degree of mass integrity may be formed on the apparatus of the invention without applying a resin binder to the veil. In forming a product of this character, a lubricant such as mineral oil or the like is applied to the newly formed fibers through the apparatus shown in Figures 1, 2 and 21 or by the means shown in Figure 34 to obtain a substantially uniform distribution of lubricant throughout the fibers collected on the collecting drums and forming the dual-layer veil. Such a veil containing only lubricant is lapped in the same manner as described hereinbefore concerning a binder-impregnated veil and the mat so formed is conveyed through a heating zone or oven of the character shown at 202 in Figure 1.

It has been found in the application of heat to the mat having the fibers treated with lubricant that, under the influence of the heat, the lubricant is thoroughly dispersed throughout the fibers of the layers and through the fibers interfelting between adjacent layers. This dispersion of lubricant through the mat imparts a degree of mass integrity, holding the layers or laminae of the mat in their assembled condition. A mat of this character may be used for many purposes where a high degree of mass integrity in the mat is not required and is especially usable in installations where the mat is subjected to heat sufficient to cause resinous binders of the character of phenol formaldehyde or the like to burn or become oxidized.

Figure 35 is illustrative of a modified method and means of reducing the temperature of or cooling the veil when the same is to be impregnated with a binder. In this form of apparatus, there is disposed beneath the fiber-collecting drums 560 and 562 a means for directing a cooling liquid onto the veil. Disposed at each side of the veil is a manifold or tube 795, each of the tubes being equipped with a plurality of spray nozzles 797, preferably uniformly spaced along the tubes throughout the width of the fibrous veil. The tubes 795 are connected to a source of cooling medium such as water. The nozzles 797 are preferably of a character arranged to project a very fine mist of cooling liquid onto the veil for cooling or lowering the temperature of the veil after the veil leaves the fiber-collecting drums 560 and 562 and in advance of the binder-applying station. It is preferable to discharge the liquid in atomized or mist form in an amount or quantity such that the liquid will be substantially evaporated or volatilized and dissipated in the atmospheric air adjacent the veil. Substantially complete volatilization is a highly important factor when a dry or powdered binder is used as any appreciable amount of moisture remaining in the veil would tend to cause caking of the binder and an improper distribution of the binder through the veil. This method of cooling may be employed per se or in conjunction with the air-cooling arrangement shown in Figures 22 and 23 and hereinbefore described.

Figure 36 is a semidiagrammatic view illustrative of a modified form of apparatus for producing fibers and assembling the fibers into webs or layers utilized to form a dual-layered veil. In this form of apparatus the fibers produced from heat-softenable mineral materials are formed by utilization of centrifugal forces. As illustrated there is provided a pair of drums 800 and 801 having foraminous peripheries providing collecting surfaces for the newly formed fibers and which rotate in directions to bring the groups of layers of fibers into a veil formation.

Disposed in the proximity of each of the drums is a forehearth 804 which is provided with a discharge trough 805 through which a stream of heat-softened or molten material is discharged. Arranged beneath each trough 805 is a pair of rotors or disks 807, one of each pair being shown in Figure 36. The disks 807 of each pair are disposed with cylindrical peripheral surfaces in close but nonengaging relation, and the stream 809 of molten material is directed into the bite between the rotors 807 which are rotated at high speeds by motors 810 or other suitable power means.

The disks of each pair rotate in opposite directions to act upon the stream 809 of molten mineral material, breaking up the stream into minute particles which are thrown away from the disks by centrifugal forces, forming long fibers. As they are formed, the fibers are collected upon the fiber-collecting drums 800 and 801 as fibrous groups 812 and 814 which are brought together to form a dual-layered veil 815. Each of the fiber-collecting drums 800 and 801 is formed with a foraminous periphery and a suction chamber 817 is disposed within each of the drums and connected by means of a tube 819 with a source of suction or subatmospheric pressure, the suction being effective throughout the arcuate areas A of the drums and through the perforations in the drums adjacent the fiber-forming zones to aid in the deposition and retention of the fibers upon the drum surfaces. Shields or housings 820 enclose the pairs of rotors, the housings extending above the material discharge trough 805 to collect any stray fibers or improperly fiberized material. A lubricant or sizing may be sprayed onto the groups of fibers 812 and 814 from the nozzles or applicators 822. This form of apparatus and fiber-attenuating means is especially adaptable for forming fibers from glass, molten slag or fusible rock. It is to be understood that the arrangement shown in Figure 36 may be utilized with the veil-cooling means, binder-impregnating and veil-lapping apparatus in the manner herein described in connection with other forms of the invention.

Figure 37 is a semidiagrammatic illustration of an arrangement for attenuating fine fibers through the utilization of high velocity, intensely hot gaseous blasts and collecting the fibers in layers or groups to produce the dual-layered veil. The apparatus is inclusive of cylindrically shaped fiber-collecting drums 800' and 801' having foraminous peripheral surfaces. The drums 800' and 801' are adapted to be driven in directions to bring the groups of fibers collected upon the upper zones of the drums into contiguous relation between the drums to form the veil.

Arranged above the drums is a plurality of internal-combustion burners 830, preferably arranged in two rows with the burners of each row spaced longitudinally of the drums. Each of the burners 830 may be of the general type illustrated in Patent No. 2,569,700, granted October 2, 1951, to Charles J. Stalego. Each of the burners consists of a metal casing 832 formed with a lining of high temperature resistant refractory material 833 forming a combustion chamber 834. The rear wall 836 of the combustion chamber is formed with a plurality of minute passages 837 through which a combustible mixture delivered to a manifold 839 may flow into the combustion chamber.

The nose end of the burner is provided with a restricted orifice 840 through which the burned gases from the combustion chamber are delivered in the form of an intensely hot, high velocity blast. The rear portion of each burner is connected by means of a tube 842 and a regulating valve 843 with a supply pipe 845 which is adapted to convey a mixture of air or other oxidant and fuel gas to the burners. The combustible mixture is continuously delivered into the chamber 834 of each burner and is substantially completely burned within the confined zone of chamber 834, and the gases undergo great expansion and are extruded or projected through the rectangularly shaped orifice 840 as an intensely hot, high velocity blast.

Rods or primary filaments 847 of heat-softenable fiber-forming material such as glass may be continuously delivered into the blasts from the burners. The extremities of the advancing rods or filaments entering the blasts are softened by the heat of the blasts and the softened material drawn out into very fine fibers 848 by the velocity of the blasts. The rods or filaments 847 may be continuously fed or conveyed into the blasts by suitable means such as pairs of feed rolls 850 rotated in directions to move the primary filaments or rods through suitable guide means 852 into the blast adjacent the orifice 840 at the zone of most intense heat. It is preferable to feed groups of primary filaments 847 into each blast so as to obtain a high production or fiber yield.

A forming hood 855 is preferably disposed between the blast-producing burners and the collecting drums to direct the fibers onto the drums. The forming hood 855 may be provided with a centrally disposed partition 857 extending longitudinally of the drums to assure the movement of the newly formed fibers into groups for collection upon the upper zones of the drums. The forming hood construction 855 and the central partition means 857 may be equipped with nozzles 860 for spraying lubricant or sizing onto the newly formed fibers, or the nozzles may be utilized to direct water spray as a fine mist into the forming hood to aid in cooling the fibers.

The fibers 848 are collected on portions of the drums 800' and 801' in the form of layers 862 and 863 under the influence of suction established in the suction boxes 817', the suction being effective on the surface of each drum from the wall of the forming hood to the zone between the drums in a horizontal plane passing through the axes of the drums.

It is to be understood that the fiber-forming apparatus and fiber-collecting arrangement disclosed in Figures 36 and 37 may be utilized in conjunction with the veil-cooling, binder-applying and laminated mat-forming means of the other forms of the invention disclosed herein.

Figures 38 and 39 illustrate an arrangement for embodying or incorporating linear reinforcing material in the dual-layered veil of fibers concomitantly with its formation. The arrangement shown in Figures 38 and 39 may be utilized with any of the methods of fiber formation disclosed herein. The fibers 870, formed by any of the fiber-attenuating methods and means disclosed and described, move downwardly through a forming hood 872 for collection in two groups or layers 873 and 874 upon the upper surface zones of fiber-collecting drums 800" and 801". The groups 873 and 874 are brought together by rotation of the drums to form a dual-layered fibrous veil 875.

Means are provided for introducing linear reinforcing material into the fibers moving through the fiber-forming hood for assembly with the two layers of fibers so as to be embedded or substantially enclosed between the two webs or layers 873 and 874 of fibers when moved into contiguous relation by rotation of the drums to form the veil 875. The reinforcing material may be formed of glass fibers or filaments in the form of linear bundles of fibers or filaments, strands, yarns, threads or the like or other linear reinforcing material capable of withstanding the elevated temperatures existing in the forming hood.

Packages or spools 878 of linear reinforcing material 880 are mounted upon suitable supports 879, the reinforcing material being delivered or fed into the fiber-forming zones 870 in the fiber-forming hood 872, the zones being preferably separated by means of a partition 882 disposed centrally of the forming hood. In the illustrated embodiment, air blowers 884, which are supplied with compressed air through tubes 885, are utilized to feed the linear reinforcing material 880 into the forming hood. The linear material may be delivered at a speed whereby the material is collected with the groups or layers of fibers forming on the drums 800" and 801" in a haphazard configuration or manner to reinforce the veil in both transverse and longitudinal directions. It is to be understood that any number of linear bundles of fibers, strands, yarns, threads or the like may be fed into the fiber-forming chamber for assembly with the layers of fibers as may be desired. Figure 39 is illustrative of the haphazard assembly and distribution of the reinforcing material 880 in the formed veil.

The linear reinforcing material may also be disposed or assembled in the veil in a predetermined pattern. For example, the reinforcing bundles of fibers, strands, yarns or threads may be assembled in the veil during its formation in transversely spaced parallel positions in the veil. To this end, supply spools 888 of linear reinforcing material 890 are mounted upon a support 891, the reinforcing material passing through guide eyes or bushings 892 mounted in the wall of the forming hood. The linear reinforcing material 890 may be fed into the zone between the fiber-collecting drums 800" and 801" and between the layers of fibers forming the veil, the pull of the veil moving downwardly serving to draw the reinforcing bundles of fibers, strands or yarns 890 into the veil.

As shown in Figure 39, the guide eyes 892 are spaced lengthwise of the drums so that the reinforcing strands, yarns or bundles of fibers are assembled in parallel relation in the veil. If desired, pairs of feed rolls 893 may be driven in directions and at a speed to deliver the reinforcing material into the forming hood at the same linear rate of travel as that of the moving veil. The reinforcing material may be embodied in the formed veil in other patterns, and the transverse arrangement or spacing of the parallel linear reinforcing elements may be varied, dependent upon the number of reinforcing elements utilized and the ultimate use of the reinforced veil.

The veil, reinforced with linear elements, may be lapped to form a laminar pack in the manner hereinbefore described in connection with other forms of the apparatus. The reinforced veil may be utilized by itself without lapping as a thin web for wrapping pipe and especially for underground pipe installations. Such a veil may be impregnated with suitable binder in a manner hereinbefore described in connection with the form of the invention shown in Figures 22 and 23 and the reinforced veil passed through a curing oven or heating zone of the character illustrated at 202 shown in Figure 1 to set the binder.

The continuous reinforcing material may be delivered to and assembled in the veil of fibers in the manner illustrated in Figure 40. The fiber-collecting drums 900 and 901 are disposed beneath a forming hood 902 and spout formations 903 in registry with glass stream feeders. The fibers 904 attenuated from the glass streams in a manner hereinbefore described are deposited upon the fiber-collecting drums 800 and 901. The linear reinforcing material 905 may be delivered into the forming hood by means of guides or feeders 906, one of which is shown in Figure 40, disposed in the crotch or juncture of the walls 907 of the spout formations 903. In this manner, the reinforcing material in the form of bundles of fibers, strands, yarns, threads or the like are delivered into the zone between the layers of fibers as they are brought together, thus forming a veil reinforced with continuous linear material.

It will be apparent that the apparatus and method of the invention are adaptable for producing and processing fibers from heat-softened material to produce novel fibrous products having superior strength characteristics and improved insulating efficiency over prior fibrous products. The arrangement facilitates the commercially practical formation of a thin fibrous web several feet in width which may be impregnated with a binding medium whereby substantially uniform distribution of the binding medium through the web is attained so that mass integrity in the laminated mat will be substantially uniform throughout the entire mat. The method of deposition of the web or veil upon a movable conveyor is effected under the influence of suction applied in a manner causing succeeding laps or folds of the web or veil to be effectively drawn or forced into close engagement with the preceding lap or layer to cause an interfelting of the fibers of adjacent layers, producing a laminated mat having high strength characteristics and yet endowed with high insulating efficiency. Due to the reorientation of fibers by stretching the veil or web and the interfelting of the fibers of adjacent layers of the web or veil in the laminated assembly, the mat has exceptionally high mechanical strength, high resistance to breakage and improved tear resistance as compared with other mats. When the veil or web is reinforced with continuous bundles of fibers or other continuous reinforcing medium embodied or embedded in the web or veil, there is provided a product which is particularly adapted for wrapping pipes and other installations where it is desired to wrap a comparatively thin fibrous layer of material around an object, The method of forming a thin veil or web of fibers and collecting the same upon a foraminous support through the use of suction operative upon the veil or web to collect the same in mat formation is of such character that the veil or web may be continuously produced at a high-production speed and assembled into a laminated product as the suction is always effective upon the thin veil or web to direct the same into engagement with the support and the preceding lap or fold of the web or veil. Thus the difficulty experienced in prior processes, wherein the fibers are accumulated in a thick mass and the effective suction through the mass is reduced because of its accumulating thickness, is completely overcome in the present method of mat formation.

Through the use of a comparatively wide veil in forming the laminated mat, the layers of the veil in the mat are disposed at a very slight angle to the major faces of the mat and are therefore in substantially parallel relation to the faces of the mat. The nearer the laminations approach a position of parallelism to the major faces of the mat, the higher the thermal effectiveness or insulating efficiency of the mat.

It is apparent that, within the scope of the invention, modifications and different arrangements may be made other than is herein disclosed, and the present disclosure is illustrative merely, the invention comprehending all variations thereof.

We claim:

1. A method of processing fibers including the steps of attenuating heat-softened material to fibers, collecting the heated fibers in the form of a layer upon a relatively movable surface, moving the surface to discharge the layer from the surface in a vertical direction and through a cooling zone, directing a stream of gas through the fibrous layer at the cooling zone to reduce the temperature of the fibers of the layer, and moving the fibrous layer away from the cooling zone, and applying binder to the cooled fibrous layer.

2. A method of processing newly formed fibers including the steps of attenuating heat-softened mineral material to fibers, collecting the hot fibers onto relatively movable surfaces forming layers of the fibers on the surfaces, moving the surfaces to bring the layers into contiguous relation to form a laminated fibrous web suspended from the surface, moving the web through a cooling zone, directing a stream of gas through the suspended web at the cooling zone to reduce the temperature of the fibers of the web, moving the cooled web to a binder applying zone, applying a binder to the web, and conveying the binder laden web through a heated zone to cure the binder.

3. A method of processing newly formed fibers including the steps of attenuating heat-softened material to fibers, collecting the hot fibers onto a movable surface, collecting the fibers on the surface in the form of a relatively thin layer, moving the layer through a cooling zone, directing a stream of air through the fibrous layer to reduce the temperature of the layer, moving the cooled fibrous layer to a binder-applying station, applying binder to the layer at said station, assembling the binder-laden layer to form a laminated mat, and conveying the mat through a heated zone to cure the binder.

4. A method of processing fibers including the steps of converting heat-softened material to fibers, collecting the fibers in independent layers, moving the layers of fibers into contiguous relation to form a multilayered freely suspended web, and progressively stretching the web in the direction of its length while in suspended condition to modify the orientation of the fibers in the web.

5. A method of forming and processing fibers including the steps of attenuating heat-softenable mineral material to fibers, applying unemulsified oil to the mineral fibers, collecting the mineral fibers in a layer, moving the layer away from the fiber-collecting surface and collecting the layer in successive overlapping folds forming a laminated mat, and applying heat to said mat to cause migratory dispersion of the oil through the fibers of the mat.

6. A method of forming and processing fibers including the steps of attenuating bodies of heat-softenable material to fibers, applying unemulsified oil to the fibers, collecting the fibers upon relatively movable surfaces in individual layers, moving the surfaces to bring the layers together to form a web suspended from the surfaces, stretching the suspended fibrous web in the direction of its length to change the orientation of the fibers in the web, lapping the web upon itself to form a laminated assemblage, conveying the laminated assemblage to a heating zone, and applying heat to the assemblage to cause migratory dispersion of the oil through the fibers of the assemblage to impart a degree of mass integrity to the assemblage.

7. A method of forming a laminated mat from mineral fibers including the steps of attenuating mineral material to fibers, collecting the fibers upon a surface to form a layer, moving the surface to discharge the layer therefrom toward a moving foraminous support, swinging the layer during its collection upon the support to form a series of overlapping laminations, applying suction through the foraminous support effective to direct the layer into close engagement with the support and the laminations, and varying the effectiveness of the suction whereby the suction is rendered more effective at the edge zones of the laminations and of lesser effectiveness intermediate the edge zones.

8. A method of forming a laminated mat from mineral fibers including the steps of attenuating mineral material to fibers, collecting the fibers upon relatively movable surfaces in independent groups, moving the surfaces to bring groups of fibers together to form a web, directing the web toward a moving foraminous support, concomitantly swinging the web in alternate directions and collecting same on the support in a series of overlapping laminations, applying suction through the foraminous support effective to direct the web into close engagement with the support and the preceding lamination, and regulating the effectiveness of the suction whereby the suction is rendered more effective at the edge zones of the laminations and of lesser effectiveness intermediate the edge zones.

9. A method of forming a reinforced fibrous product including the steps of attenuating heat-softenable material to fibers in a fiber forming zone, collecting the fibers in independent groups, delivering linear reinforcing material in the form of continuous bundles of fibers into the fiber-forming zone, moving the groups of fibers together whereby the fibers and linear reinforcing material are collected into a web suspended from the surfaces, conveying the reinforced web to a binder-applying zone, directing a binder into the web while in suspended condition at the binder-applying zone, collecting the binder impregnated web on a relatively movable foraminous support, and moving the web of fibers and reinforcing material through a heating zone to cure the binder in the web.

10. A method of forming a reinforced fibrous product including the steps of attenuating heat-softenable material to fibers in a fiber-forming zone, collecting the fibers in spaced groups upon convergingly arranged surfaces, delivering linear reinforcing material in the form of continuous bundles of fibers into the fiber-forming zone, moving the surfaces to convey the groups of fibers into contiguous relation whereby the attenuated fibers and reinforcing material are collected into a web suspended from the surfaces, conveying the reinforced web to a binder-applying zone, applying a heat-curable binder to the web while in suspended condition at the binder-applying zone, moving the web toward a foraminous support, directing forces against the suspended web in alternate directions to cause the web to be lapped upon the support, moving the support to collect the laps of the web in progressive overlapping relation to form a laminated mat, and moving the mat through a heating zone to cure the binder.

11. A method of forming a reinforced fibrous product including the steps of directing heated fibers onto collecting surfaces to form thin layers of fibers, directing continuous linear reinforcing elements into engagement with at least one of the layers, moving the surfaces to bring the layers into contiguous relation to form a web suspended from the surfaces with the reinforcing elements embodied in the web, moving the reinforced web through a cooling zone to cool the fibers, lowering the temperature of the web in said zone, moving the cooled web to a binder-applying station, applying a binder to the web, and applying heat to cure the binder in the web.

12. A method of forming a reinforced fibrous product including the steps of directing fibers onto converging collecting surfaces to form thin layers with the fibers disposed haphazardly in the layers, directing continuous bundles of fibers into engagement with the fibers of at least one of the layers, moving the surfaces to bring the layers into contiguous relation to form a dual-layered web depending from the surfaces with the bundles of fibers disposed in the web, moving the assembled web and bundles of fibers to a binder-applying station, and applying a binder to the web for retaining the continuous bundles of fibers and the layers of fibers in integrated relation.

13. Apparatus for producing and processing fibers including, in combination, means for forming fibers from heat-softened material, a pair of relatively movable surfaces arranged to receive the fibers in independent layers on said surfaces, means for moving the surfaces to bring the layers of fibers together to form a web depending from the surfaces, a relatively movable conveyor adapted to receive said depending web, and means disposed between said fiber-collecting surfaces and said conveyor for progressively stretching the depending web in the direction of its length to reorient the fibers in the web.

14. Apparatus for forming and processing fibers including, in combination, means for producing fibers from heat-softened material, a pair of relatively movable surfaces disposed to receive the heated fibers in independent layers on said surfaces, means for moving the surfaces to bring the layers of fibers together to form a web depending from the surfaces, means for projecting a cooling medium into contact with the depending web to reduce the temperature of the fibers of the web, means for applying a binding agent to the depending web, a relatively movable conveyor adapted to receive said web, means disposed between said fiber-collecting surfaces and said conveyor for progressively stretching the depending web in the direction of its length to reorient the fibers in the web.

15. Apparatus for forming and processing fibers including, in combination, means for producing fibers from heat-softened material, a pair of relatively movable surfaces disposed to receive the heated fibers in independent layers on said surfaces, means for moving the surfaces to bring the layers of fibers together to form a web depending from the surfaces, means for projecting a cooling medium into contact with the web while in a depending state to reduce the temperature of the fibers of the web, means for impregnating the web with a binding agent, a relatively movable conveyor adapted to receive said web, and means for oscillating the depending web during its collection upon the conveyor to form a laminated mat.

16. Apparatus for forming and processing fibers including in combination, means for attenuating heat-softened material to fibers, a relatively movable fiber-collecting surface disposed to receive the fibers in a relatively thin layer, means for moving the surface to convey the collected layer of fibers away from the surface, a movable conveyor upon which the layer is adapted to be collected in a plurality of progressively overlapping folds, means for oscillating the layer to form the folds, said oscillating means including a plurality of groups of nozzles arranged at each side of the layer, means for periodically supplying gas under pressure to said nozzles whereby blasts of the gas therefrom cause oscillating movement of the layer, and regulating means for varying the pressure of the gaseous blasts from the groups of nozzles.

17. Apparatus for forming and processing fibers including, in combination, means for attenuating heat-softened material to fibers, a pair of relatively movable fiber-collecting surfaces disposed to receive the fibers in relatively thin layers, means for moving the surfaces to bring the layers of fibers together to form a web, a movable conveyor upon which the web is adapted to be collected in a plurality of progressively overlapping folds, means for oscillating the web to form the folds, said oscillating means including a plurality of groups of nozzles arranged at each side of the layer, means for periodically supplying gas under pressure to said nozzles whereby blasts of the gas therefrom cause oscillating movement of the web, regulating means for varying the pressure of said blasts from the groups of nozzles, and means engageable with the assembled folds of the web to compact the overlapping folds into a laminated mat.

18. Apparatus for forming and processing fibers including, in combination, means for attenuating heat-softened material to fibers, a plurality of relatively movable fiber-collecting surfaces disposed to receive the fibers in independent groups, means for moving the surfaces to bring the collected groups of fibers together to form a web, means for establishing a cooling zone adjacent the web whereby the temperature of the fibers of the web is reduced at the cooling zone, means for impregnating the web with a binder, a movable conveyor upon which the web is adapted to be collected, means for oscillating the web to deposit the same on the conveyor in a plurality of progressively overlapping layers, said oscillating means including a plurality of groups of nozzles arranged at each side of the web, the groups being spaced transversely of the web, means for supplying gas under pressure to said nozzles whereby blasts of the gas therefrom cause oscillating movement of the web, regulating means for varying the effectiveness of said gaseous blasts from the groups of nozzles, means for compacting the overlapping layers to form a mat, and a heating zone through which the mat is conveyed to cure the binder.

19. Apparatus for forming and processing fibers including, in combination, means for converting heat-softenable material to fibers, a plurality of relatively movable surfaces adapted to collect the fibers in independent groups upon said surfaces, means for moving the surfaces in directions to bring the groups of fibers into contiguous relation to form a web and to direct the formed web away from the surfaces, a plurality of groups of spaced rolls, each group of rolls being adapted for engagement with opposite faces of the web, said rolls of each group being driven at progressively increased speeds to stretch the web, in the direction of its length, and a relatively movable conveyor for collecting the web.

20. Apparatus for forming and processing fibers including, in combination, means for producing fibers from heat-softened material, means for delivering a mineral oil onto the fibers, a pair of relatively rotatable cylindrical surfaces disposed to receive fibers in independent layers on said cylindrical surfaces, means for rotating the surfaces to bring the layers of fibers together to form a web, a relatively movable conveyor adapted to receive said web in overlapping layers in echelon relation, means for compacting the layers for interfelting the fibers of adjacent layers to form a mat, a heating zone, said conveyor being arranged to move the mat through the heating zone whereby the mineral oil is dispersed throughout the layers to establish mass integrity in the mat.

21. Apparatus for forming and processing fibers including means for attenuating heat-softened material to fibers, a hood in which said fibers are confined, a pair of foraminous-surfaced drums adapted to receive fibers from the hood, said fibers being formed in independent groups upon said drums, suction means effective in each of said drums for directing the fibers onto the drums, means for continuously rotating said drums in opposite directions to bring the groups of fibers into contiguous relation to form a web, a cooling zone adjacent said fiber-collecting drums for reducing the temperature of the fibers of the web, a plurality of spaced binder-applying stations arranged at opposite sides of the web, means for projecting a binder into the web at the binder-applying stations, means engageable with the web and movable at speeds to cause progressive stretching of the web as it moves through the binder-applying stations, a relatively movable foraminous conveyor disposed beneath the binder-applying zones for collecting the web, means for establishing suction effective through the conveyor to draw the web to the conveyor, and baffle means for controlling the effectiveness of the suction transversely of the conveyor.

22. Apparatus for forming and processing fibers including means for attenuating heat-softened material to fibers, a hood in which said fibers are confined, a pair of foraminous-surfaced drums adapted to receive fibers from the hood, said fibers being formed in independent groups upon said drums, suction means effective in each of said drums for directing the fibers onto the drums, means for continuously rotating said drums in opposite directions to bring the groups of fibers into contiguous relation to form a web, a cooling zone adjacent said fiber-collecting drums for reducing the temperature of the fibers of the web, a plurality of spaced binder-applying zones arranged at opposite sides of the web, means for entraining a binder in an air stream and projecting the binder-laden stream into the web at the binder-applying zones, a plurality of means engageable with the web and movable at different speeds to cause progressive stretching of the web, a plurality of groups of nozzles disposed at opposite sides of the web, a relatively movable conveyor for collecting the web, said groups of nozzles being connected with a supply of compressed air, and means for projecting blasts of the compressed air alternately against opposite sides of the web to cause the web to be lapped upon itself on the conveyor to form a laminated mat.

23. Apparatus for forming and processing fibers including, in combination, means for converting heat-softenable material to fibers, a hood in which the fibers are formed, a pair of relatively rotatable cylindrical members having foraminous surfaces disposed adjacent the hood and adapted to collect the fibers in independent groups upon said surfaces, means for rotating the cylindrical members in directions to bring the groups of fibers into contiguous relation to form a web, means for directing a cooling medium into contact with the web for reducing the temperature of the fibers of the web, means spaced from said cooling medium applying means for projecting a binder into the web of fibers, said binder-applying means including a plurality of elongated binder-dispensing devices disposed at each side of the web, means for entraining binder in an air stream and discharging the air stream through the web, means for controlling the temperature of the air stream, a suction means adjacent each of said binder-applying means to cause the binder to penetrate into the interior fibers of the web, a rotatable foraminous roll associated with each of said suction means and adapted for engagement with the web, said foraminous rolls being driven at progressively increased speeds to stretch the web in the direction of its length as it is moved past the binder-applying means, and a relatively movable conveyor for collecting the binder-impregnated web in overlapping layers to form a laminated mat.

24. Apparatus for forming and processing fibers including, in combination, means for producing fibers from heat-softened material, a hood in which the fibers are formed, a pair of relatively movable surfaces disposed to receive fibers from the forming zone, said fibers being collected in independent layers on said surfaces, means for moving the surfaces to bring the layers together to form a dual-layered web, a cooling zone, a binder-applying station, said web being directed through the cooling zone to reduce the temperature of the web, means for applying a binding agent to the web at the binder-applying station, a relatively movable foraminous conveyor upon which the web is adapted to be collected, a plurality of groups of nozzles disposed at opposite sides of the web above the conveyor, said groups of nozzles being connected with a compressed air supply, valve means for controlling the flow of compressed air through the groups of nozzles whereby the blasts of air from the nozzles at opposite sides of the web are effective to cause oscillation of the web whereby the web is collected in progressively overlapping folds to form a laminated mat upon the conveyor, and regulating means for each of said groups of nozzles for controlling the effectiveness of the air blasts directed against the web during the web-lapping operation.

25. Apparatus for forming and processing fibers including, in combination, means for converting heat-softened material to fibers, a relatively movable member having a surface adapted to receive the fibers forming a fibrous layer thereon, means for moving the surface to continuously discharge the layer from the member, a relatively movable foraminous conveyor, means for directing the fibrous layer onto the conveyor in progressively overlapping folds to form a laminated pack, means for establishing suction adjacent the conveyor to draw the layer toward the conveyor, and adjustable baffle means for controlling the effectiveness of the suction transversely of the conveyor.

26. Apparatus for forming and processing fibers including, in combination, means for flowing streams of heat-softened mineral material from a supply, means for directing gaseous blasts into engagement with the streams to attenuate the streams to fibers, a pair of relatively rotatable cylindrical surfaces disposed to receive fibers direct from the forming zone, said fibers being collected in independent groups on said surfaces, means for supplying linear reinforcing material for assembly with at least one of said groups of fibers, means for rotating the surfaces to bring the groups of fibers together to form a web with the linear reinforcing material embedded in the web, a binder-applying means for impregnating the web with a binding agent, a heating zone, and means for conveying the reinforced web through the heating zone to cure the binding agent.

27. Apparatus for forming a reinforced fibrous web including, in combination, means for producing fibers from heat-softened material, a chamber for confining the fibers, a pair of relatively rotatable cylindrical surfaces disposed to receive fibers from the chamber in independent layers on said surfaces, means for introducing linear reinforcing material in the form of continuous bundles of fibers into the chamber for assembly with at least one of said layers of fibers, means for rotating the surfaces to bring the layers of fibers together to form a web with the linear reinforcing material embedded in the web, a binder-applying means for impregnating the web with a binding agent, a heating zone, and means for conveying the reinforced web through the heating zone to cure the binding agent.

28. An article of manufacture comprising a plurality of layers of mineral fibers arranged in echelon relation forming a laminated mat, a mineral oil distributed through the fibers of the layers wherein the oil is dispersed under the influence of heat through the layers of fibers to impart mass integrity to the mat.

29. An article of manufacture comprising a plurality of laminations of a fibrous web arranged in echelon relation forming a laminated mat, the web comprising a plurality of layers of fibers, continuous bundles of fibers embedded in the web providing reinforcement for the web, and a binding agent distributed throughout the laminations of the mat to impart mass integrity to the mat.

30. A method of forming and processing fibers including the steps of attenuating heat-softened fiber-forming material to fibers, collecting the attenuated fibers in a thin layer upon a collecting surface, continuously moving the surface to discharge the layer from the surface whereby the layer is freely suspended from the surface, and stretching the layer in the direction of its length while in suspended condition as it moves away from the surface.

31. A method of forming and processing fibers including the steps of attenuating heat-softened fiber-forming material to fibers, collecting the fibers in independent groups upon relatively movable collecting surfaces, moving the surfaces to direct the groups of fibers into contiguous relation to form a web suspended from the surfaces, directing the web through a cooling station, flowing a stream of air through the suspended web at the cooling zone to convey heat from the fibers, delivering binder in a dry state into the suspended web and stretching the web in the direction of its length as it moves away from the fiber collecting surfaces to modify the orientation of the fibers and distribute the binder through the web.

32. The method of forming and processing fibers including the steps of directing streams of heat-softened mineral material onto rapidly moving surfaces whereby the material is converted to fibers by centrifugal forces, collecting the fibers into two groups, bringing the groups of fibers together to form a dual layered web, and lapping the web in overlapping folds in echelon relation to form a laminated pack.

33. Apparatus for forming and processing fibers including, in combination, a pair of relatively rotatable members disposed in spaced relation, means for rotating the members at comparatively high speeds, means for delivering a stream of heat-softened mineral material into engagement with each rotating member whereby the material of the streams is converted to fibers by centrifugal forces, a pair of movable surfaces upon which the fibers are collected in independent layers, means for moving the surfaces to bring the layers of fibers together to form a web, a movable conveyor, and means for directing the web of fibers onto the conveyor in progressively overlapping folds to form a laminated mat.

References Cited in the file of this patent

UNITED STATES PATENTS

| | | |
|---|---|---|
| 1,740,990 | MacKenzie | Dec. 24, 1929 |
| 1,834,309 | Harney | Dec. 1, 1931 |
| 2,018,478 | Whittier | Oct. 22, 1935 |
| 2,086,757 | Williams | July 13, 1937 |
| 2,318,244 | McClure | May 4, 1943 |
| 2,341,130 | Unsworth | Feb. 8, 1944 |
| 2,431,205 | Slayter | Nov. 18, 1947 |
| 2,528,091 | Slayter | Oct. 31, 1950 |
| 2,561,843 | Coleman | July 24, 1951 |
| 2,569,765 | Kellett et al. | Oct. 2, 1951 |
| 2,571,334 | Browne | Oct. 16, 1951 |
| 2,671,496 | Chavannes et al. | Mar. 9, 1954 |
| 2,697,678 | Ness | Dec. 21, 1954 |

FOREIGN PATENTS

| | | |
|---|---|---|
| 470,675 | Great Britain | Aug. 19, 1937 |